United States Patent
Hanagami et al.

(10) Patent No.: US 11,590,766 B2
(45) Date of Patent: Feb. 28, 2023

(54) RECORDING APPARATUS

(71) Applicant: SEIKO EPSON CORPORATION, Tokyo (JP)

(72) Inventors: Taiki Hanagami, Kitakyushu (JP); Makoto Wada, Kitakyushu (JP); Kazuya Yoshikaie, Kitakyushu (JP); Hiroyuki Tajima, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 388 days.

(21) Appl. No.: 16/795,867

(22) Filed: Feb. 20, 2020

(65) Prior Publication Data
US 2020/0269620 A1    Aug. 27, 2020

(30) Foreign Application Priority Data

Feb. 22, 2019  (JP) .............................. JP2019-030239
May 28, 2019  (JP) .............................. JP2019-099497

(51) Int. Cl.
| | |
|---|---|
| *B41J 3/36* | (2006.01) |
| *B41J 29/02* | (2006.01) |
| *B41J 29/393* | (2006.01) |
| *H01M 50/20* | (2021.01) |
| *H01M 50/247* | (2021.01) |

(52) U.S. Cl.
CPC ................ *B41J 3/36* (2013.01); *B41J 29/02* (2013.01); *B41J 29/393* (2013.01); *H01M 50/20* (2021.01); *H01M 50/247* (2021.01); *B41J 2029/3932* (2013.01); *H01M 2220/30* (2013.01)

(58) Field of Classification Search
CPC ........................................................ B41J 3/36
See application file for complete search history.

(56) References Cited

U.S. PATENT DOCUMENTS

| | | | |
|---|---|---|---|
| 2004/0150368 A1 | 8/2004 | Horigome | |
| 2008/0152417 A1* | 6/2008 | Heaton ...................... | B41J 3/36 400/693 |
| 2010/0177468 A1* | 7/2010 | Liu ....................... | H01M 50/209 361/679.01 |
| 2014/0220405 A1* | 8/2014 | Damon ............... | H01M 50/244 429/120 |
| 2018/0026239 A1* | 1/2018 | Shintani .............. | H01M 50/256 429/167 |

FOREIGN PATENT DOCUMENTS

JP      2004-229449 A    8/2004

* cited by examiner

*Primary Examiner* — Scott A Richmond
(74) *Attorney, Agent, or Firm* — Workman Nydegger

(57) ABSTRACT

A battery mount portion includes a recessed portion into which a portion of a battery enters, a coupling terminal provided inside the recessed portion and configured to be electrically coupled to the battery, and a covering portion that covers the coupling terminal and that constitutes a portion of the housing. In a state in which the battery is unmounted, a cover that covers an area in the battery mount portion other than the covering portion is detachably attachable, and a portion where the cover and the housing overlap each other in a depth direction of the recessed portion is located outside a path of a liquid heading towards the coupling terminal after entering the recessed portion through a portion where the cover and the covering portion oppose each other.

5 Claims, 21 Drawing Sheets

FIG. 3
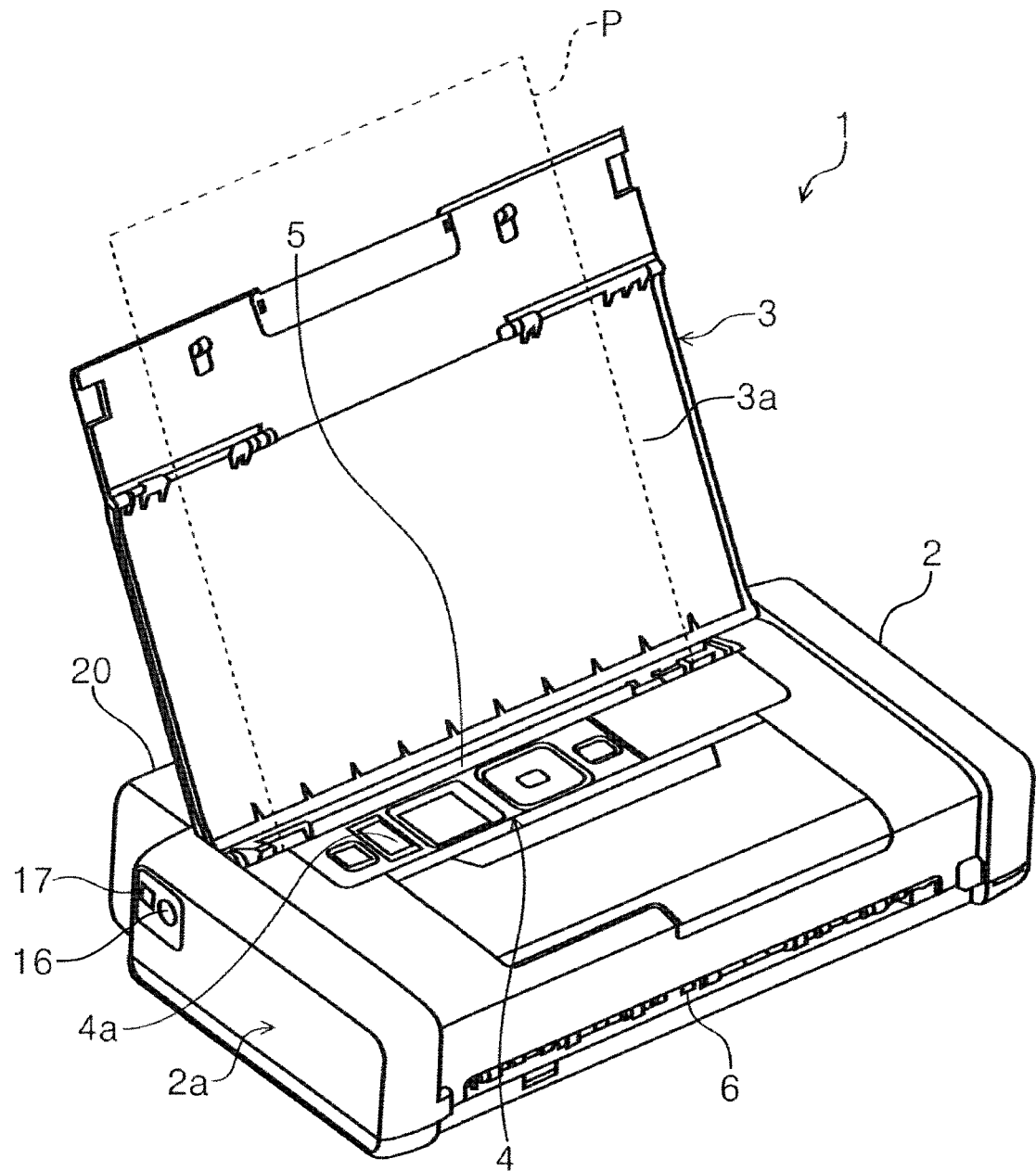
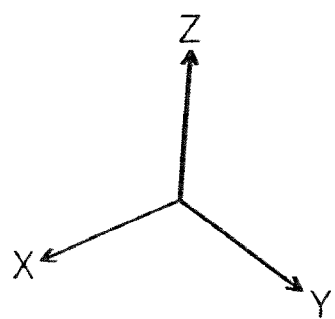

RECORDING APPARATUS

The present application is based on, and claims priority from JP Application Serial Number 2019-030239, filed Feb. 22, 2019 and JP Application Serial Number 2019-099497, filed May 28, 2019, the disclosures of which are hereby incorporated by reference herein in their entirety.

BACKGROUND

1. Technical Field

The present disclosure relates to a recording apparatus including a battery mount portion to which a battery is detachably attachable.

2. Related Art

An example of a recording apparatus is a printer. In printers, especially those of a mobile type is configured to include a battery detachably attachable to an apparatus body so that the printer can be used outdoors where there is no commercial power supply (see JP-A-2004-229449, for example).

Since a coupling terminal for coupling the battery is provided in a mount portion in which the battery is mounted, desirably, the mount portion is covered by a cover so that foreign matter does not adhere to the coupling terminal when the battery is in an uncoupled state. Particularly, when a liquid adheres to the coupling terminal, the coupling terminal may become deteriorated.

However, even when covered, a liquid such as water may enter the joint between the cover and the housing of the apparatus and may adhere to the coupling terminal and deteriorate the coupling terminal. The above includes a case in which, for example, a surface of a printer in which the cover is provided is placed face down on a table on which a liquid such as water adheres.

Particularly, when there is a portion in which the cover and the housing of the apparatus overlap each other, the portion forms an entering path when the liquid enters from the outside. The portion where the cover and the housing of the apparatus overlap each other is a portion that suppresses the cover from rising when the cover is mounted on the housing and is a portion that is needed to fix the cover. Such a portion forms an entering path when a liquid enters from the outside. The coupling terminal may become deteriorated by the liquid adhered to the coupling terminal.

SUMMARY

A recording apparatus of the present disclosure that overcomes the above issue includes a housing including a recording unit that performs recording on a medium, and a battery mount portion which is provided in the housing, and to which a battery is detachably attachable, the battery supplying electric power to perform recording on a medium with the recording unit. The battery mount portion includes a recessed portion into which a portion of the battery enters, a coupling terminal provided inside the recessed portion and configured to be electrically coupled to the battery, a covering portion that covers the coupling terminal and that constitutes a portion of the housing, and a cover that, in a state in which the battery is unmounted, covers an area in the battery mount portion other than the covering portion. A portion where the cover and the housing overlap each other in a depth direction of the recessed portion is located outside a path of a liquid heading towards the coupling terminal after entering the recessed portion through a portion where the cover and the covering portion oppose each other.

BRIEF DESCRIPTION OF THE DRAWINGS

FIG. 3 is a perspective view illustrating the printer on which the second battery is mounted, and in a state in which a cover member is open.

DESCRIPTION OF EXEMPLARY EMBODIMENTS

Figure 1:
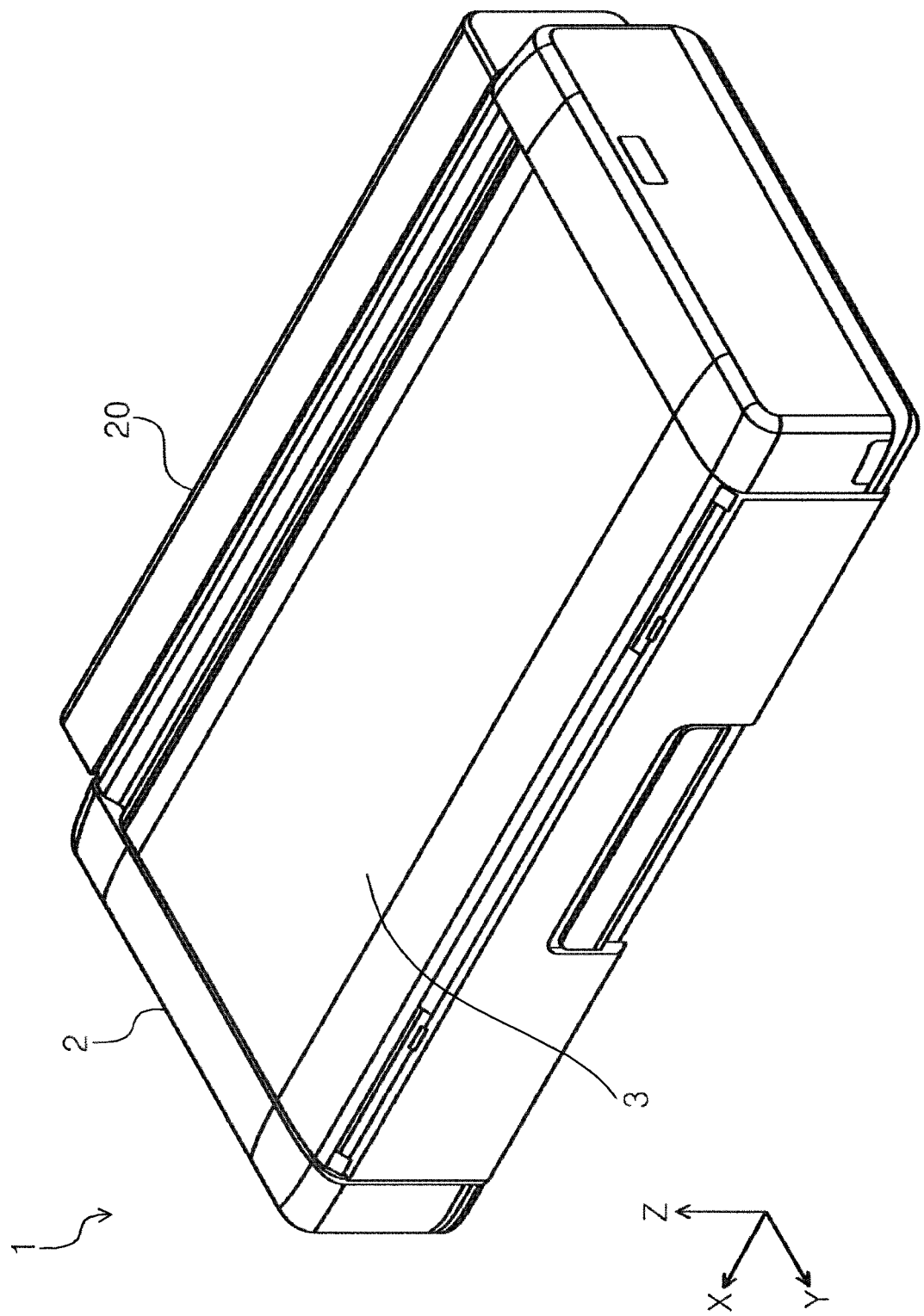
FIG. 1 is a perspective view of a printer, on which a second battery is mounted, viewed from the front.

Hereinafter, an outline of the present disclosure will be described.

A recording apparatus according to a first aspect includes a housing including a recording unit that performs recording on a medium, and a battery mount portion which is provided in the housing, and to which a battery is detachably attachable, the battery supplying electric power to perform recording on a medium with the recording unit. The battery mount portion includes a recessed portion into which a portion of the battery enters, a coupling terminal provided inside the recessed portion and configured to be electrically coupled to the battery, and a covering portion that covers the coupling terminal and that constitutes a portion of the housing. In a state in which the battery is unmounted, a cover that covers an area in the battery mount portion other than the covering portion is detachably attachable, and a portion where the cover and the housing overlap each other in a depth direction of the recessed portion is located outside a path of a liquid heading towards the coupling terminal after entering the recessed portion through a portion where the cover and the covering portion oppose each other.

According to the present aspect, since a portion where the cover and the housing overlap each other in the depth direction of the recessed portion is located outside the path of the liquid heading towards the coupling terminal after entering the recessed portion through a portion where the cover and the covering portion oppose each other, even when the liquid enters through the portion where the cover and the covering portion oppose each other, in other words, the joint between the cover and the covering portion, the liquid can be suppressed from advancing straight towards the coupling terminal.

A recording apparatus according to a second aspect includes a housing including a recording unit that performs recording on a medium, and a battery mount portion which is provided in the housing, and to which a battery is detachably attachable, the battery supplying electric power to perform recording on a medium with the recording unit. The battery mount portion includes a recessed portion into which a portion of the battery enters, a coupling terminal provided inside the recessed portion and configured to be electrically coupled to the battery, and a covering portion that covers the coupling terminal and that constitutes a portion of the housing. In a state in which the battery is unmounted, a cover that covers an area in the battery mount portion other than the covering portion is detachably attachable, and the cover and the housing include, in a path of a liquid heading towards the coupling terminal after entering the recessed portion through a portion where the cover and the covering portion oppose each other, a portion overlapping each other in a depth direction of the recessed portion, and a groove portion into which the liquid enters is formed in the portion overlapping each other.

According to the present aspect, since the cover and the housing include the portion overlapping each other in the depth direction of the recessed portion in the path of the liquid heading towards the coupling terminal after entering the recessed portion through a portion where the cover and the covering portion oppose each other, and since a groove portion in which the liquid enters is formed in the portion overlapping each other, even when the liquid enters through the portion where the cover and the covering portion oppose each other, in other words, the joint between the cover and the covering portion, the liquid can be suppressed from advancing straight towards the coupling terminal.

A recording apparatus according to a third aspect includes a housing including a recording unit that performs recording on a medium, and a battery mount portion which is provided in the housing, and to which a battery is detachably attachable, the battery supplying electric power to perform recording on a medium with the recording unit. The battery mount portion includes a recessed portion into which a portion of the battery enters, a coupling terminal provided inside the recessed portion and configured to be electrically coupled to the battery, and a covering portion that covers the coupling terminal and that constitutes a portion of the housing. In a state in which the battery is unmounted, a cover that covers an area in the battery mount portion other than the covering portion is detachably attachable, and the cover and the housing include, in a path of a liquid heading towards the coupling terminal after entering the recessed portion through a portion where the cover and the covering portion oppose each other, a portion overlapping each other in a depth direction of the recessed portion, and a liquid absorber that absorbs the liquid is provided in the portion overlapping each other.

According to the present aspect, since the cover and the housing include the portion overlapping each other in the depth direction of the recessed portion in the path of the liquid heading towards the coupling terminal after entering the recessed portion through a portion where the cover and the covering portion oppose each other, and since a liquid absorber that absorbs the liquid is provided in the portion overlapping each other, even when the liquid enters through the portion where the cover and the covering portion oppose each other, in other words, the joint between the cover and the covering portion, the liquid can be suppressed from advancing straight towards the coupling terminal.

In a fourth aspect according to any one of the first to third aspects, the covering portion is provided so as to, with respect to a distal end of the coupling terminal, extend in a direction in which the coupling terminal extends.

According to the present aspect, since the covering portion is provided so as to, with respect to the distal end of the coupling terminal, extend in the direction in which the coupling terminal extends, even when the liquid enters through the portion where the cover and the covering portion oppose each other, in other words, the joint between the cover and the covering portion, the liquid can be suppressed from reaching the coupling terminal.

In a fifth aspect according to any one of the first to fourth aspects, a cut-out portion is formed in a periphery of the cover, and the cut-out portion is formed in the periphery of the cover at a position away from the portion where the cover and the covering portion oppose each other.

According to the present aspect, since the cut-out portion is formed in the periphery of the cover, by hooking a finger to the cut-out portion, the cover can be detached from the housing easily. While such a cut-out portion allows the liquid to enter the recessed portion, since the cut-out portion is formed in the periphery of the cover at the position away from the portion where the cover and the covering portion oppose each other, even when the liquid enters through the cut-out portion, the liquid can be suppressed from reaching the coupling terminal.

In a sixth aspect according to the fifth aspect, a restriction wall that restricts foreign matter from entering from the cut-out portion to the recessed portion is provided on a back surface of the cover.

According to the present aspect, since the restriction wall that restricts foreign matter from entering from the cut-out portion to the recessed portion is provided on the back surface of the cover, entering of foreign matter from the cut-out portion to the recessed portion can be restricted with the restriction wall.

A recording apparatus according to a seventh aspect includes a housing that includes a recording unit that performs recording on a medium, and a battery mount portion provided in the housing, the battery mount portion including a battery that supplies electric power to perform recording on a medium with the recording unit and that is detachably attachable thereto. The battery mount portion includes a recessed portion into which a portion of the battery enters, a coupling terminal that is provided inside the recessed portion and that is configured to be electrically coupled to the battery. The battery includes a charging terminal coupled to the coupling terminal, and an angle restricting portion that restricts an angle formed between the coupling terminal and the charging terminal by abutting against the housing.

When the battery is mounted on the battery mount portion, in a case in which the angle formed between the coupling terminal and the charging terminal becomes large, the coupling between the coupling terminal and the charging terminal may become faulty. According to the present aspect, since the battery includes the angle restricting portion that restricts the angle formed between the coupling terminal and the charging terminal by abutting against the housing, the angle formed between the coupling terminal and the charging terminal when coupling the coupling terminal and the charging terminal to each other can be suppressed from becoming large, and the coupling terminal and the charging terminal can be coupled to each other appropriately.

In an eighth aspect according to the seventh aspect, the angle restricting portion includes a projection that abuts against the external surface of the housing.

In a ninth aspect according to the seventh aspect, the angle restricting portion includes a projection that abuts against an abutting surface that extends in the battery mount portion in a direction in which the battery is slid.

A recording apparatus according to a tenth aspect includes a housing that includes a recording unit that performs recording on a medium, and a battery mount portion provided in the housing, the battery mount portion including a battery that supplies electric power to perform recording on a medium with the recording unit and that is detachably attachable thereto. The battery mount portion includes a recessed portion into which a portion of the battery enters, and a coupling terminal that is provided inside the recessed portion and that is configured to be electrically coupled to the battery. The battery includes a charging terminal coupled to the coupling terminal. In a state in which a portion of the battery has entered the recessed portion, the coupling terminal and the charging terminal oppose each other at correct positions.

When the battery is mounted on the battery mount portion, in a case in which the angle formed between the coupling terminal and the charging terminal becomes large, the coupling between the coupling terminal and the charging terminal may become faulty. According to the present aspect, since the coupling terminal and the charging terminal oppose each other at correct positions while in a state in which a portion of the battery has entered the recessed portion, the coupling terminal and the charging terminal can be coupled to each other appropriately.

Hereinafter, exemplary embodiments of the present disclosure will be described in detail.

Note that in each drawing, a direction extending along an X-axis is an apparatus width direction. Hereinafter, directions extending along the X-axis, in other words, when a +X direction and a −X direction are not distinguished, the directions will be referred to as an "X-axis direction".

Furthermore, a direction extending along a Y-axis is an apparatus depth direction, a +Y direction is a direction extending from an apparatus rear surface towards a front surface, and a −Y direction is a direction extending from the apparatus front surface towards the rear surface. Hereinafter, directions extending along the Y-axis, in other words, when the +Y direction and the −Y direction are not distinguished, the directions will be referred to as a "Y-axis direction".

Furthermore, a direction extending along a Z-axis is the vertical direction, a +Z direction is a direction extending towards the upper side in the vertical direction, and a −Z direction is a direction extending towards the lower side in the vertical direction. Hereinafter, directions extending along the Z-axis, in other words, when the +Z direction and the −Z direction are not distinguished, the directions will be referred to as a "Z-axis direction".

Among lateral surfaces constituting a periphery of the apparatus according to the present exemplary embodiment, a lateral surface in which a battery mount portion 50 is provided is the apparatus rear surface.

An ink jet printer 1 serving as an example of the "recording apparatus" that performs recording on a medium includes a housing 2 provided therein components such as a recording head 10 (FIG. 4) that performs printing on a medium. The housing 2 has a box-shaped appearance. Note that the term ink jet printer will be abbreviated to a printer. An example of the medium includes a recording sheet.

The printer 1 includes a cover member 3 that is opened/closed by being pivoted relative to the housing 2. In a closed state illustrated in FIG. 1, the cover member 3 constitutes an upper surface and a portion of the front surface of the printer 1. The cover member 3 includes a pivot shaft (not shown) on the apparatus rear side of the housing 2, and is set to an open position illustrated in FIG. 3 when, relative to the housing 2, pivoted towards the apparatus rear side. When the cover member 3 is in the open position with respect to the housing 2, an inner surface of the cover member 3 functions as a mount surface 3a of a medium P.

Furthermore, when the cover member 3 changes from the closed position illustrated in FIG. 1 to the open position illustrated in FIG. 3, an operation unit 4 and a medium supplying portion 5 are exposed in the upper portion of the housing 2, and a discharge portion 6 is exposed in the front surface of the housing 2. The operation unit 4 includes a power button, a print setting button, a display panel, and the like to operate the printer 1.

When the medium P is mounted on the mount surface 3a of the cover member 3, the medium supplying portion 5 supplies the medium P from the mount surface 3a towards a recording area of the recording head 10 inside the housing 2. Furthermore, the discharge portion 6 allows the medium P fed from the mount surface 3a, through the medium supplying portion 5, into the housing 2 to be discharged through the apparatus front surface after recording has been performed thereon by the recording head 10 described later.

In the printer 1 illustrated in FIG. 4, the medium P mounted on the mount surface 3a is sent from the medium supplying portion 5 to a portion below the recording head 10 with a feeding device 8 and a transport device 9. Subsequently, ink serving as the liquid is ejected onto the medium P from the recording head 10 and recording is performed on the medium P.

Figure 4:
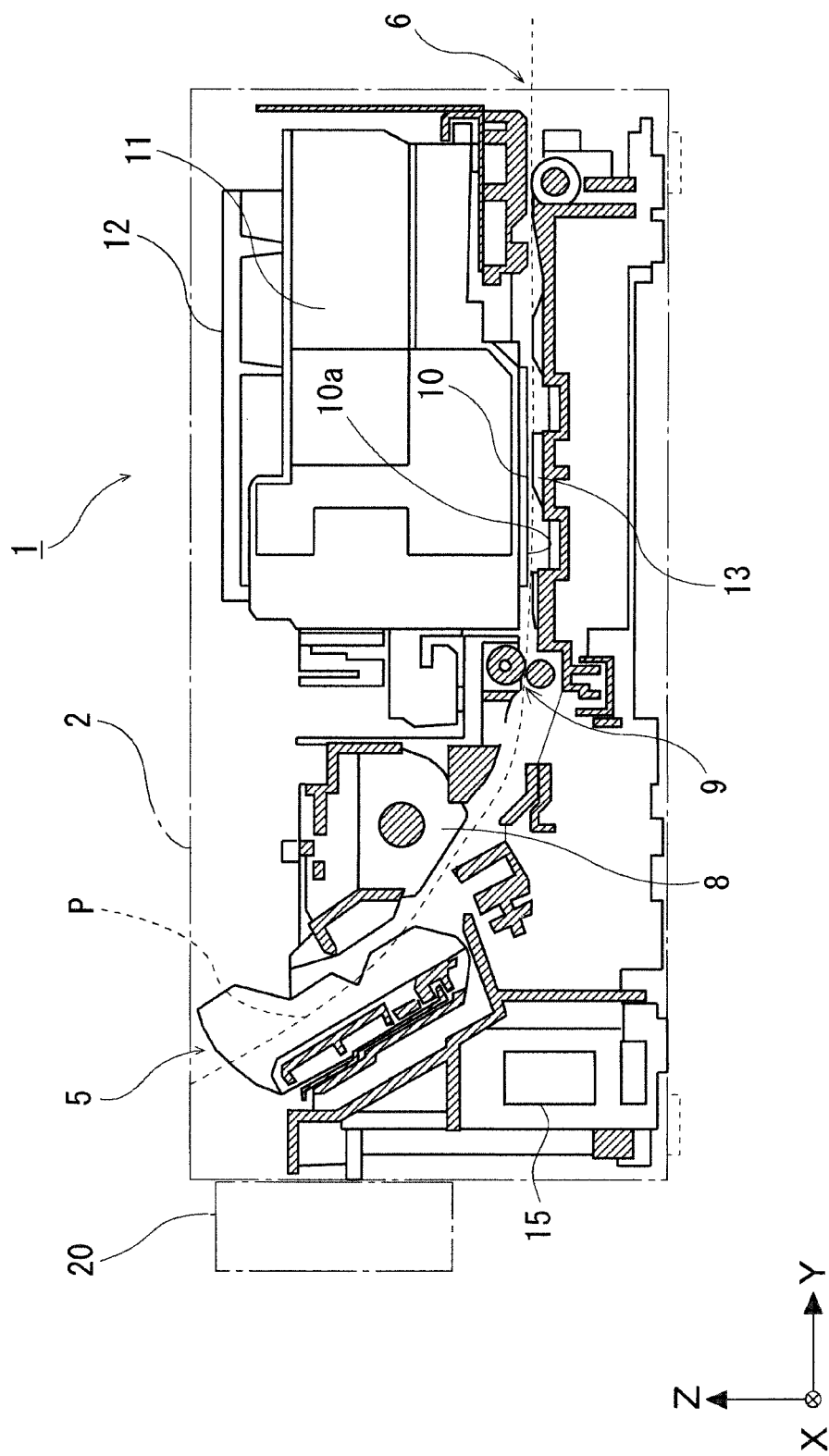
FIG. 4 is a schematic sectional side view depicting a medium transport path of the printer.

The recording head 10 is provided in a carriage 11 that reciprocates in the X-axis direction, which is a width direction that intersects a transport direction of the medium P in FIG. 4. The recording head 10 ejects the ink through nozzle rows (not shown) provided in a liquid ejection surface 10a.

At least one ink cartridge 12 that supplies the ink, used for performing recording on the medium P, to the recording head 10 is mounted in the carriage 11.

A support member 13 that supports the medium P at the recording area opposing the recording head 10 is provided below the recording head 10 illustrated in FIG. 4. Recording is performed by ejecting the ink from the liquid ejection surface 10a of the recording head 10 onto the medium P supported by the support member 13. The medium P on which recording has been performed is discharged through the discharge portion 6 (see FIG. 3 as well) provided in the front surface of the housing 2.

The printer 1 includes a first battery 15 (FIG. 4) provided inside the housing 2, and a second battery 20 (FIGS. 1 and 2) provided on the outer side of the housing 2 in a detachable manner. The first battery 15 and the second battery 20 are rechargeable batteries configured to feed power to operating units such as the recording head 10, the feeding device 8, and the transport device 9.

The second battery 20 is detachable from the battery mount portion 50 (FIG. 5) provided on the outer side of the housing 2, and feeds power to the above operating units of the printer 1 when in a mounted state illustrated in FIG. 1. In the present exemplary embodiment, the battery mount portion 50 is provided in a rear surface of the housing 2. The battery mount portion 50 includes a recessed portion 18, a coupling terminal 19, and an engaged portion 14, which will be described in detail later.

Figure 2:
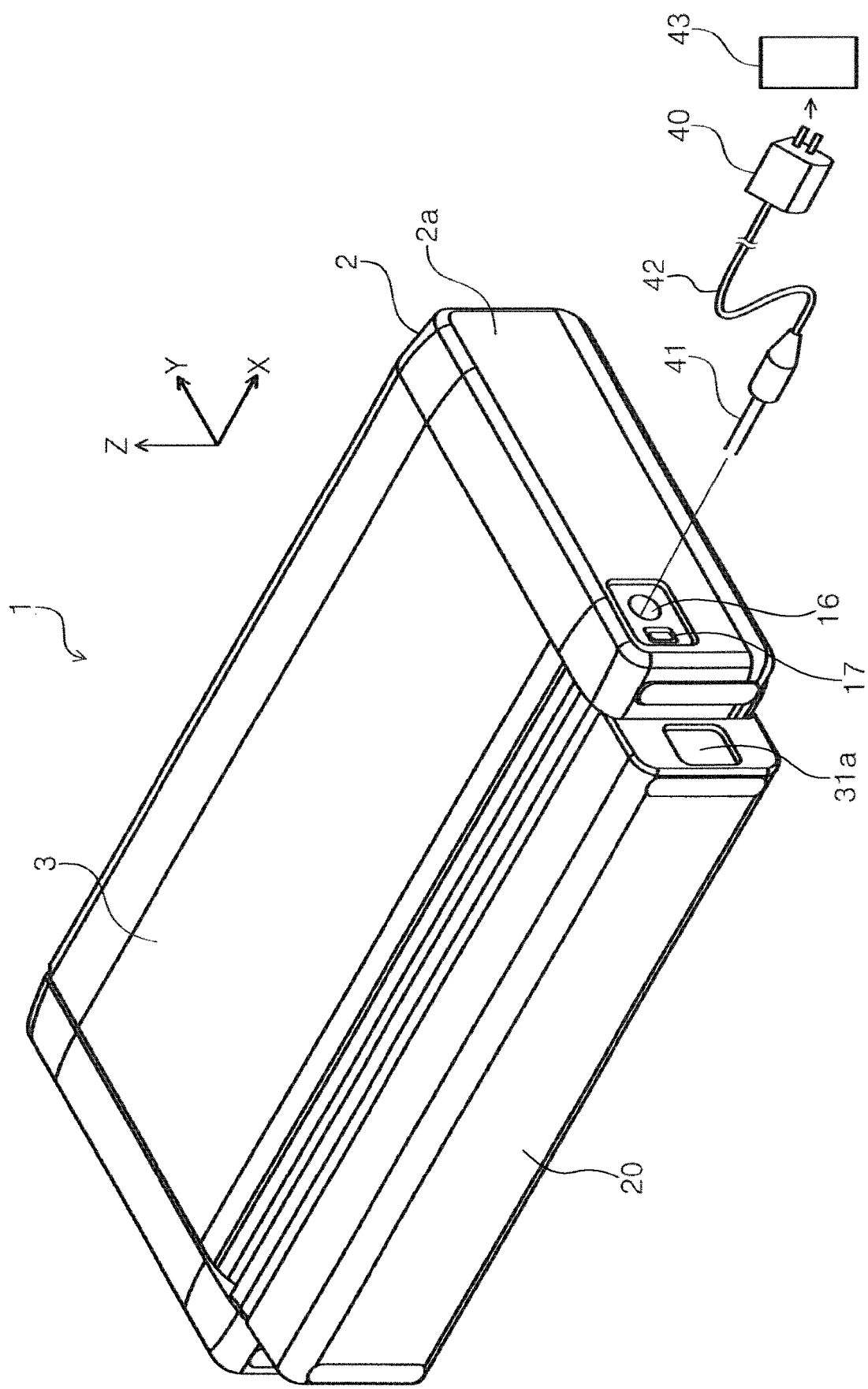
FIG. 2 is a perspective view of the printer, on which the second battery is mounted, viewed from behind.

As illustrated in FIG. 2, a first coupling portion 16 to which a plug 41 of a power adapter 40 can be coupled is provided in a lateral surface 2a of the housing 2 of the printer 1 in the +X direction. The power adapter 40 is, for example, coupled to a commercial power supply outlet 43 inside a room and is an AC adapter that supplies power through the commercial power supply. A cable 42 is coupled to the power adapter 40. One end of the cable 42 is coupled to the power adapter 40, and the plug 41 inserted in the first coupling portion 16 is provided at the other end of the cable 42.

Note that adjacent to the first coupling portion 16, a USB cable coupling portion 17 is provided in the lateral surface 2a of the housing 2.

When the plug 41 is coupled to the first coupling portion 16 and power is supplied through the power adapter 40, the operating units inside the housing 2, such as the recording head 10, the feeding device 8, and the transport device 9 become drivable.

Furthermore, when the plug 41 of the power adapter 40 is coupled to the first coupling portion 16, the printer 1 is configured to be switchable between a first charging state in which the first battery 15 is charged and a second charging state in which the second battery 20 is charged. In other words, charging the first battery 15 and charging the second battery 20 can be performed by feeding power through the first coupling portion 16.

Note that a second coupling portion 21 (FIG. 7) to which the plug 41 can be coupled is provided in the second battery 20. Same as the first coupling portion 16, the second coupling portion 21 is also a DC power jack. In other words, even when the second battery 20 is in a detached state, the second battery 20 can be charged by coupling the plug 41 to the second coupling portion 21 (FIG. 7) of the second battery 20.

Figure 7:
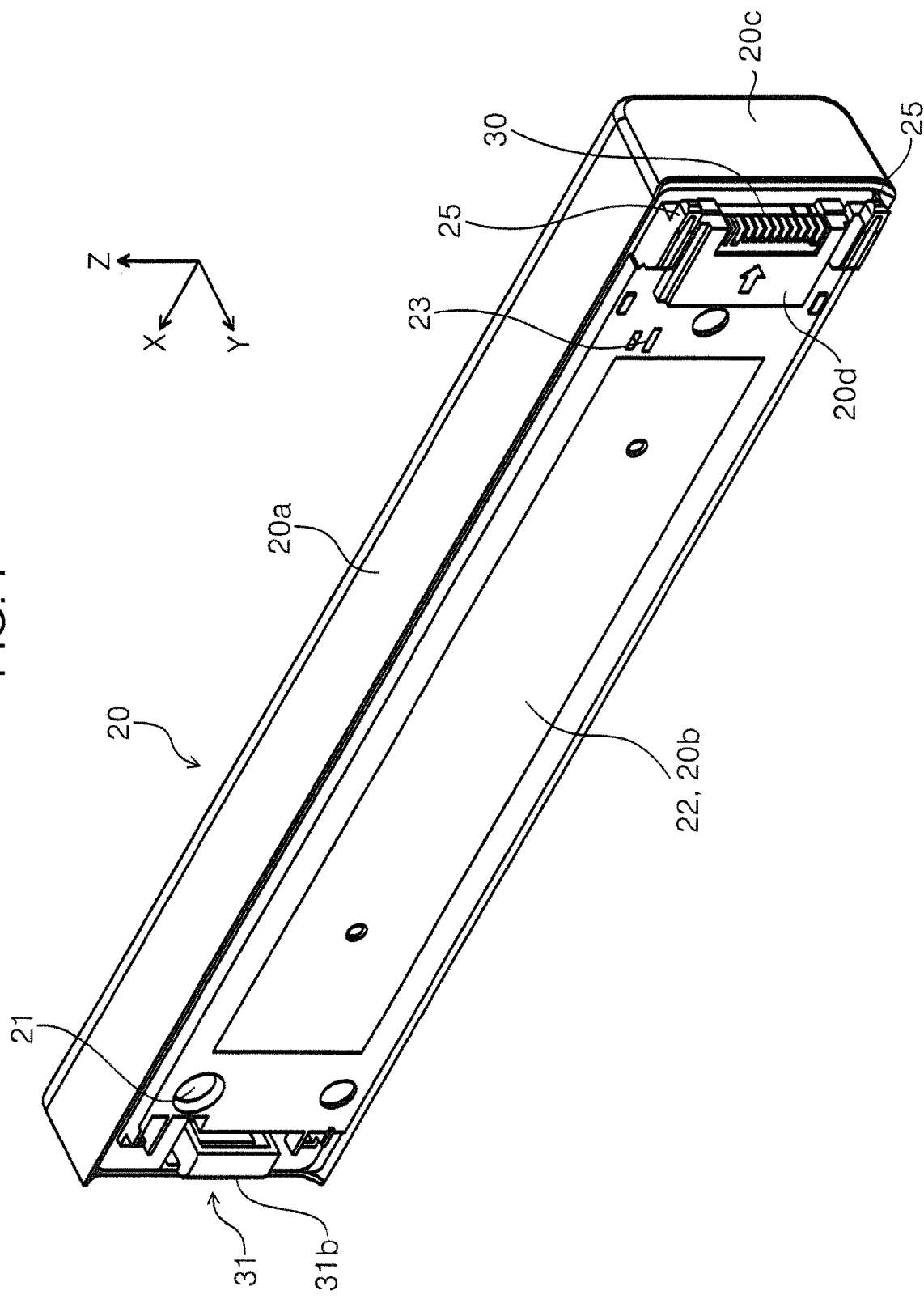
FIG. 7 is an external perspective view of the second battery.

As illustrated in FIG. 7, the second battery 20 includes a second display device 23 that displays the charge status of the second battery. For example, an LED lamp can be used as the second display device 23. The second display device 23 indicates, for example, whether the second battery 20 is being charged or whether charging has been completed, and facilitates visual confirmation of the charge status.

Note that a first display device 4a configured to display the charge statuses of both the first battery 15 and the second battery 20 is provided in the operation unit 4 (FIG. 3) provided in the housing 2 of the printer 1.

For example, a liquid crystal panel can be used as the first display device 4a to display whether in the first charging state in which the first battery 15 is charged or whether in the second charging state in which the second battery 20 is charged. Furthermore, the first display device 4a can be configured to display the charged amounts of the first battery 15 and the second battery 20.

Figure 5:
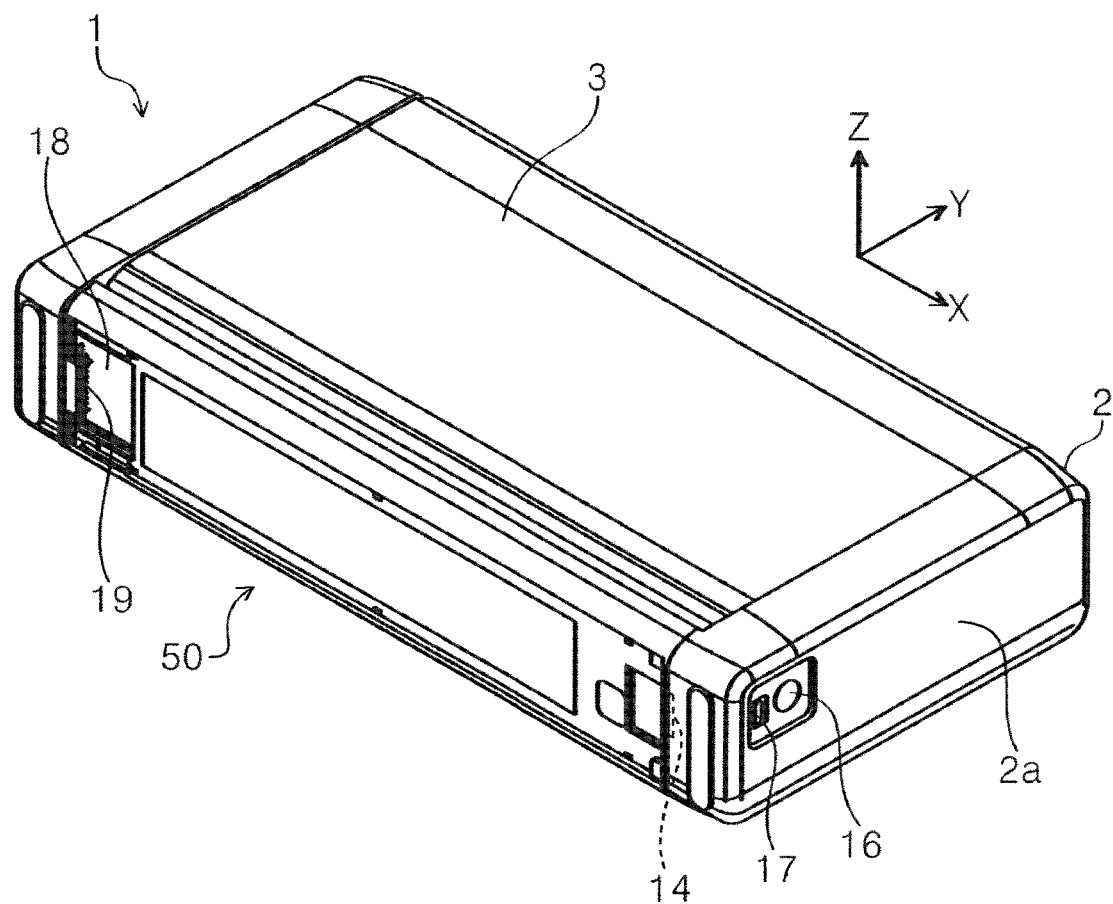
FIG. 5 is a perspective view of the printer, on which the second battery and the cover are not mounted, viewed from behind.

As illustrated in FIG. 7, an appearance of the second battery 20 is formed by a battery case 20a and a battery cover 20b. The battery cover 20b becomes an opposing surface 22 that opposes the battery mount portion 50 (FIG. 5).

A charging terminal 30 coupled to the coupling terminal 19 (FIG. 6) provided in the housing 2 is provided in the second battery 20 at an end portion of the battery cover 20b in the −X direction. Furthermore, a hook portion 31b that locks the second battery 20 in the mounted state to the housing 2 is provided at an end portion of the battery cover 20b in the +X direction.

Figure 6:
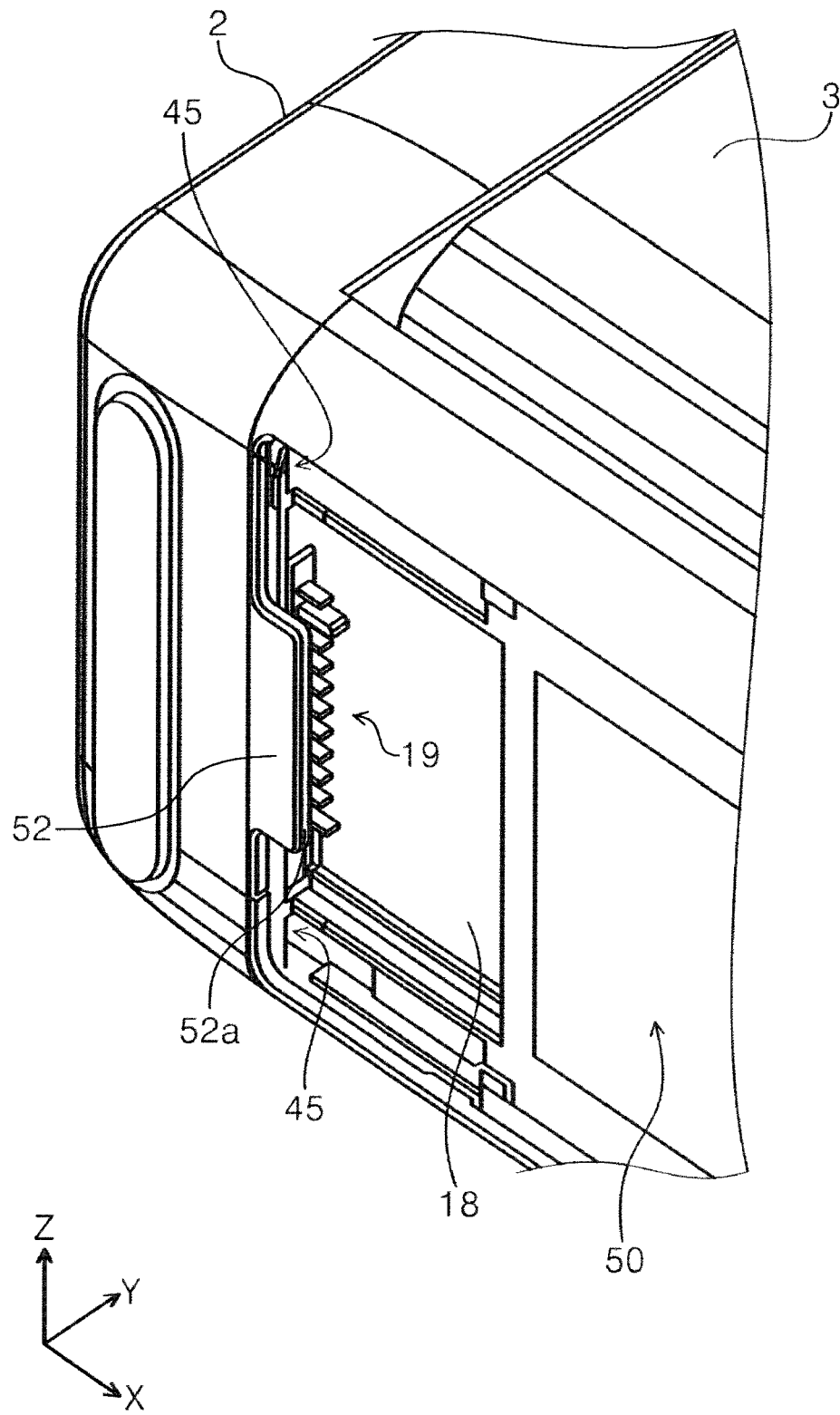
FIG. 6 is an enlarged perspective view of an essential portion in FIG. 5.

Two protruded portions 25 are provided at the end portion of the second battery 20 in the −X direction that is where the charging terminal 30 is provided. Furthermore, as illustrated in FIG. 6, the recessed portion 18 into which a portion of the second battery 20 enters is provided in the battery mount portion 50, and two receiving portions 45 are formed in the recessed portion 18.

Figure 8:
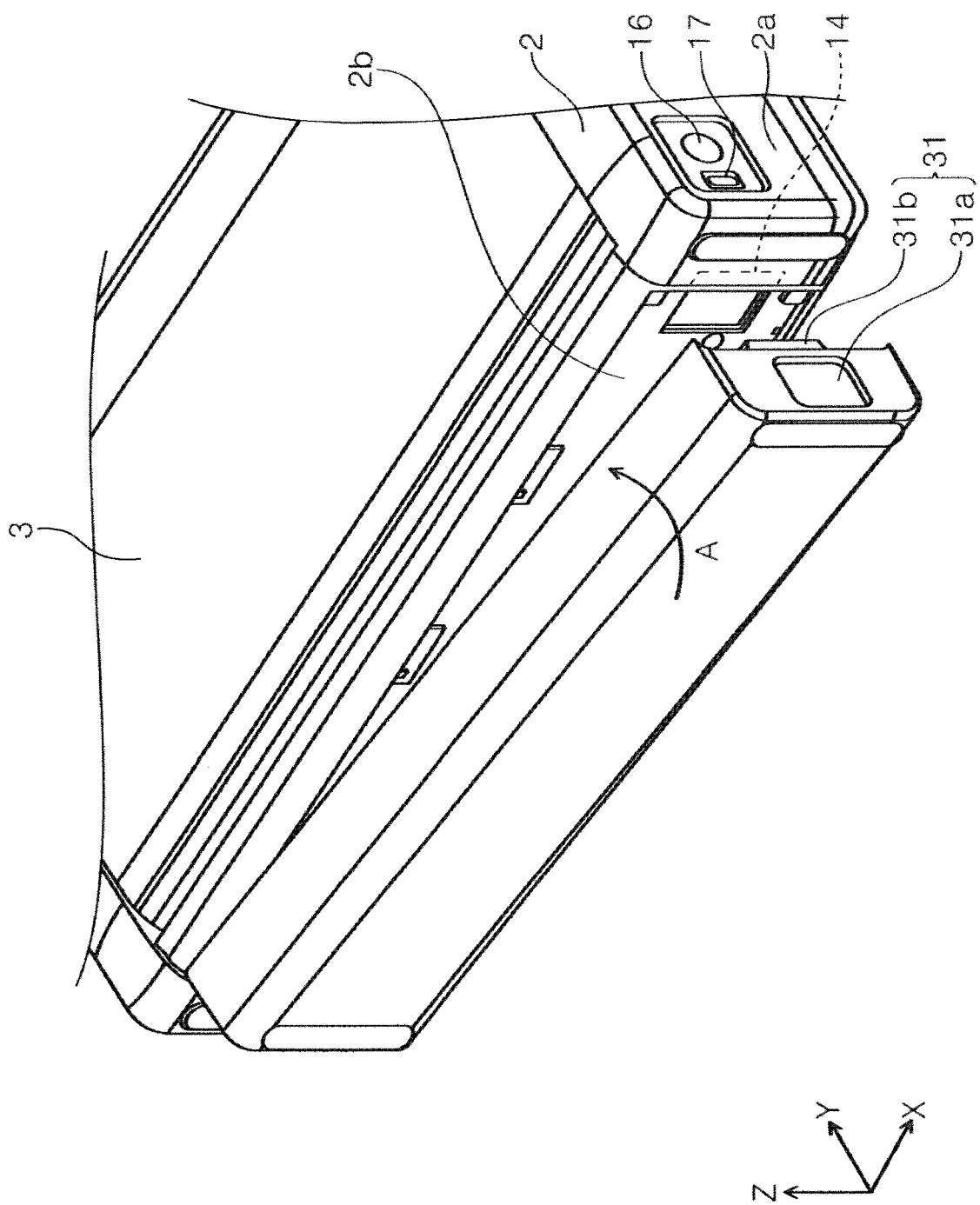
FIG. 8 is a perspective view illustrating a second battery mounting process.

Furthermore, as illustrated in FIG. 8, the end portion of the second battery 20 in the −X direction is inserted into the recessed portion 18 when mounting the second battery 20. In so doing, the protruded portions 25 (FIG. 7) of the second battery 20 are inserted into the receiving portions 45 (FIG. 6) of the recessed portion 18. With the above, the end portion of the second battery 20 in the −X direction is fixed so as not to be uncoupled from the recessed portion 18, and the coupling terminal 19 of the body and the charging terminal 30 of the battery are electrically coupled to each other.

After inserting the end portion of the second battery 20 in the −X direction into the recessed portion 18, as illustrated in FIG. 8, the second battery 20 is pivoted in an arrow A direction.

Note that the hook portion 31b is provided at the end portion of the second battery 20 in the +X direction, and the engaged portion 14 that is hooked to the hook portion 31b is formed at the end portion of the battery mount portion 50 in the +X direction. The hook portion 31b is pressed in the +X direction with a spring (not shown), and by pushing a release portion 31a in the −X direction, the hook portion 31b countering the pressing force of the spring can be displaced in the −X direction.

Accordingly, as illustrated in FIG. 8, when the end portion of the second battery 20 in the +X direction is pivoted in the arrow A direction, the hook portion 31b becomes hooked to the engaged portion 14 and the end portion of the second battery 20 in the +X direction becomes fixed. To release the above fixed state, the release portion 31a is pushed in the −X direction.

With the above, the hook portion 31b and the release portion 31a constitute a lock device 31 that locks the second battery 20 to the battery mount portion 50.

Referring next to FIG. 8 and the subsequent drawings, a cover 60 that covers the entire battery mount portion 50 when the second battery 20 is not mounted on the battery mount portion 50 will be described.

Figure 9:
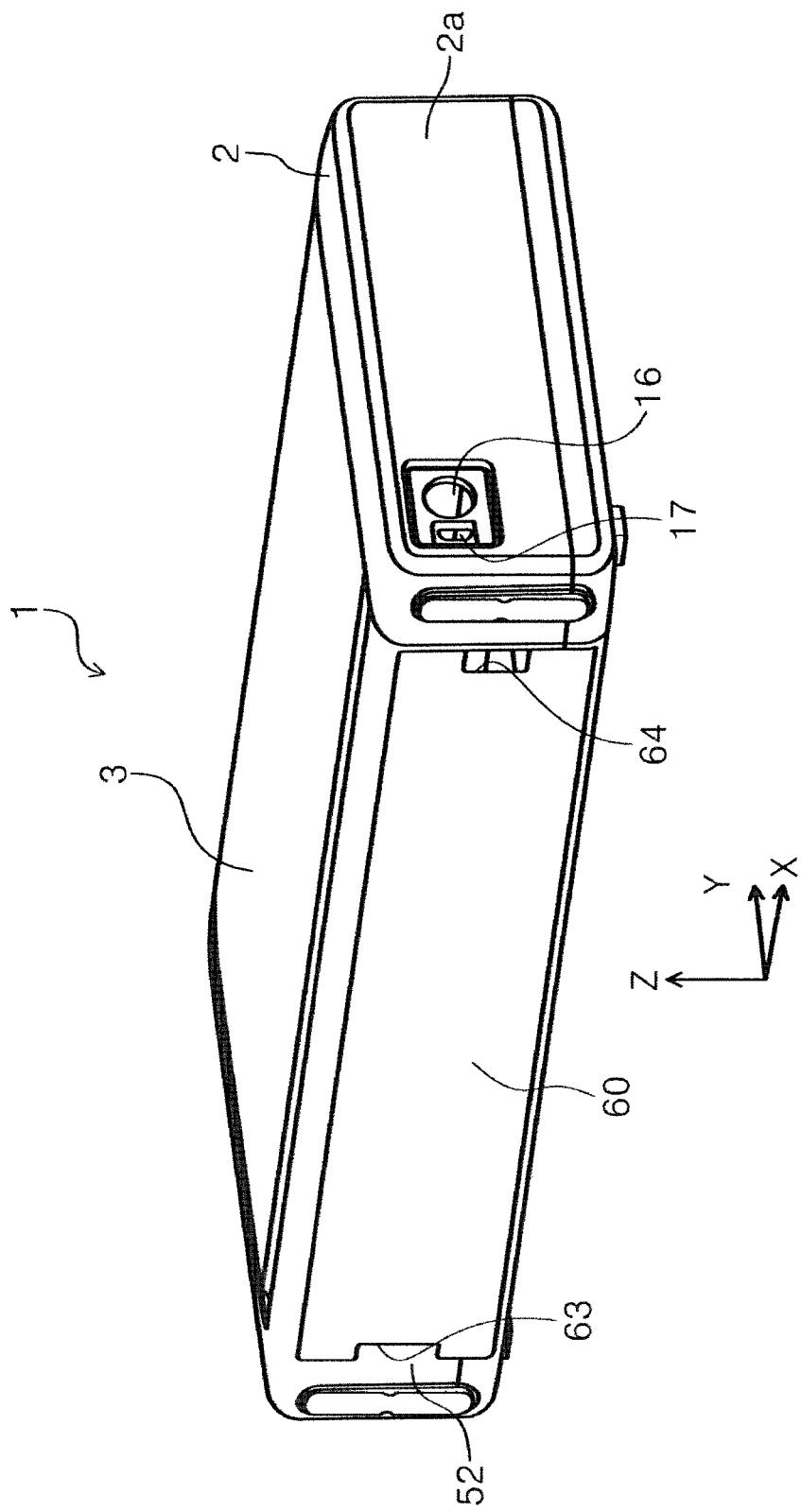
FIG. 9 is a perspective view of the printer, on which the cover is mounted, viewed from behind.

When the second battery 20 is not mounted, as it is apparent from FIG. 6, the coupling terminal 19 of the recessed portion 18 is exposed and foreign matter may adhere thereto; accordingly, as illustrated in FIG. 9, the cover 60 is configured so as to be attachable to the battery mount portion 50.

Figure 10:
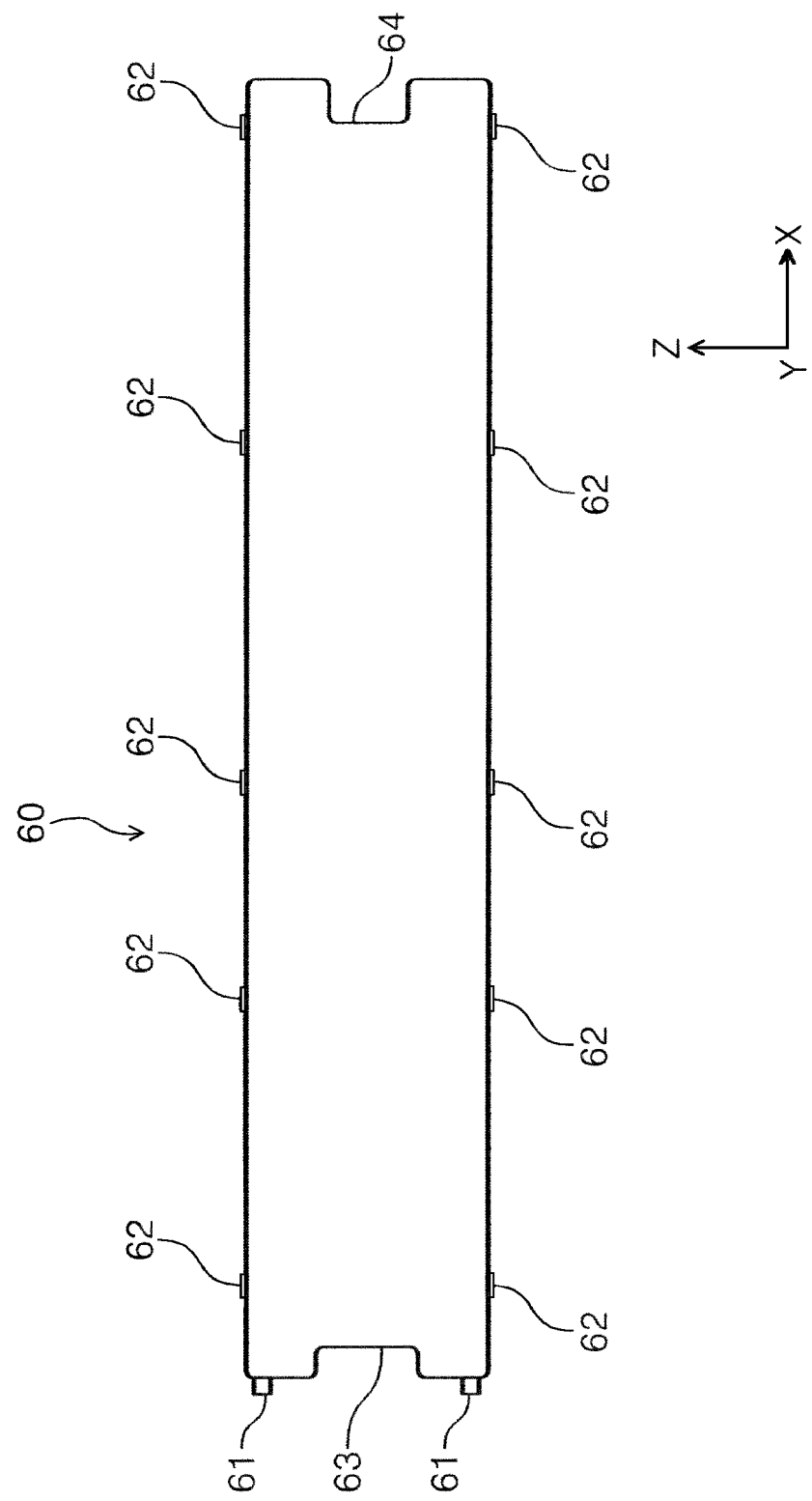
FIG. 10 is a plan view of the cover.

The entire cover 60 is integrally formed of a resin material and is configured so as to be elastically deformable. As illustrated in FIGS. 9 and 10, in the cover 60, a recessed portion 63 is formed at the end portion in the −X direction, and a recessed portion 64 serving as a cut-out portion is formed at the end portion in the +X direction.

As illustrated in FIG. 6, a covering portion 52 that covers the coupling terminal 19 is formed in the battery mount portion 50 integrally with the housing 2. The recessed portion 63 of the cover 60 is formed so as to correspond to the shape and size of the covering portion 52, in other words, the recessed portion 63 is formed with such a shape and size as to avoid the covering portion 52. The covering portion 52 limits the amount of exposure of the coupling terminal 19 to a minimum when the cover 60 is not mounted. Note that in the present exemplary embodiment, the covering portion 52 is a portion extending in the +X direction with respect to a position X1 in FIG. 13, in other words, the covering portion 52 is a portion protruded in the +X direction.

Figure 11:
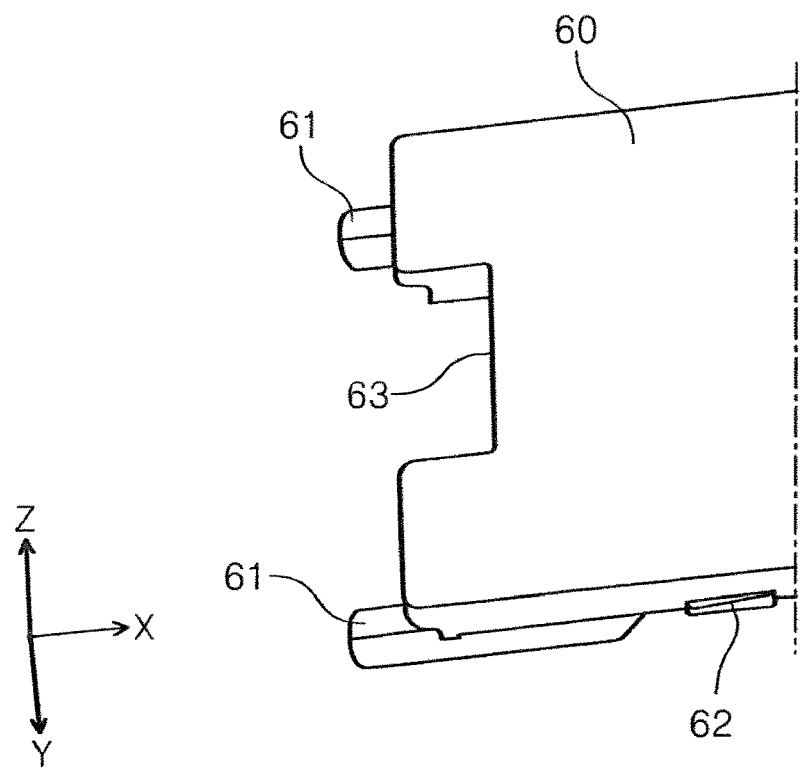
FIG. 11 is a partial perspective view of the front side of the cover.

As illustrated in FIGS. 10 and 11, two protruded portions 61 are formed at the end portion of the cover 60 in the −X direction. The end portion of the cover 60 in the −X direction is fixed by having the protruded portions 61 enter the receiving portions 45 (FIG. 6) formed in the recessed portion 18 on the body. In other words, the protruded portions 61 formed in the cover 60 correspond to the protruded portions 25 (FIG. 7) formed in the second battery 20.

Furthermore, protrusions 62 are formed in the X-axis direction at an edge portion of the cover 60 in the +Z direction and at an edge portion of the cover 60 in the −Z direction. By having the protrusions 62 be inserted in the receiving portions (not shown) formed in the battery mount portion, the cover 60 is prevented from rising in the −Y direction.

The recessed portion 64 formed at the end portion of the cover 60 in the +X direction forms an opening into which, as illustrated in FIG. 9, a finger is inserted when the cover 60 is in a mounted state.

Attaching of the cover 60 to the battery mount portion 50 is performed in a manner similar to the attaching of the second battery 20 that has been described while referring to FIG. 8. In other words, the protruded portions 61 formed at the end portion of the cover 60 in the −X direction are inserted in the receiving portions 45 (FIG. 6) formed in the recessed portion 18 on the body and, subsequently, the entire cover 60 is pushed inwards in the arrow A direction in FIG. 8. With the above, while the entire cover 60 is elastically deformed, the protrusions 62 enter the receiving portions not illustrated, and the cover 60 becomes attached.

Figure 12:
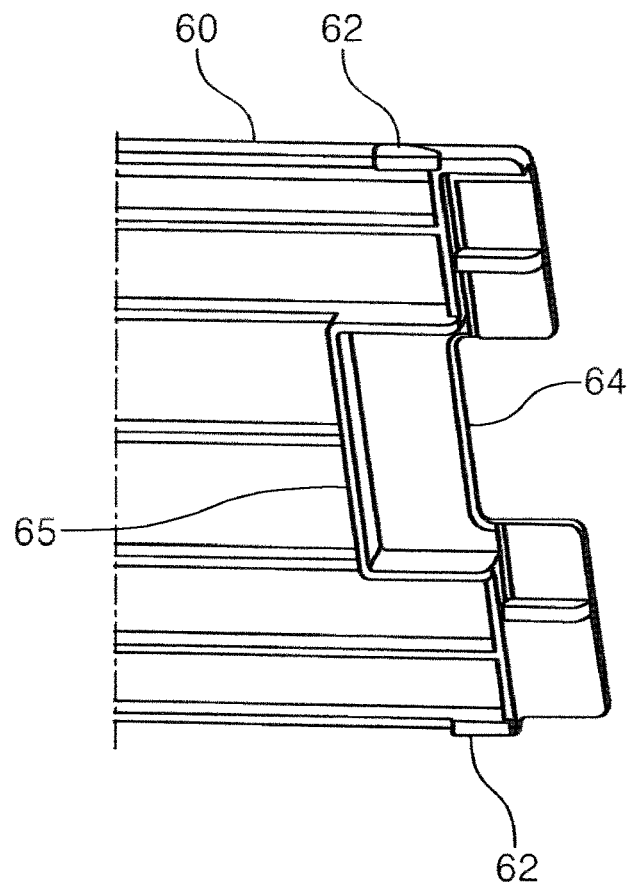
FIG. 12 is a partial perspective view of the back side of the cover.

Note that as illustrated in FIG. 12, in the cover 60, a restriction wall 65 is formed on the back surface of the end portion in the +X direction. The restriction wall 65 restricts foreign matter from entering the recessed portion 18 (FIG. 6) from the recessed portion 64.

Figure 13:
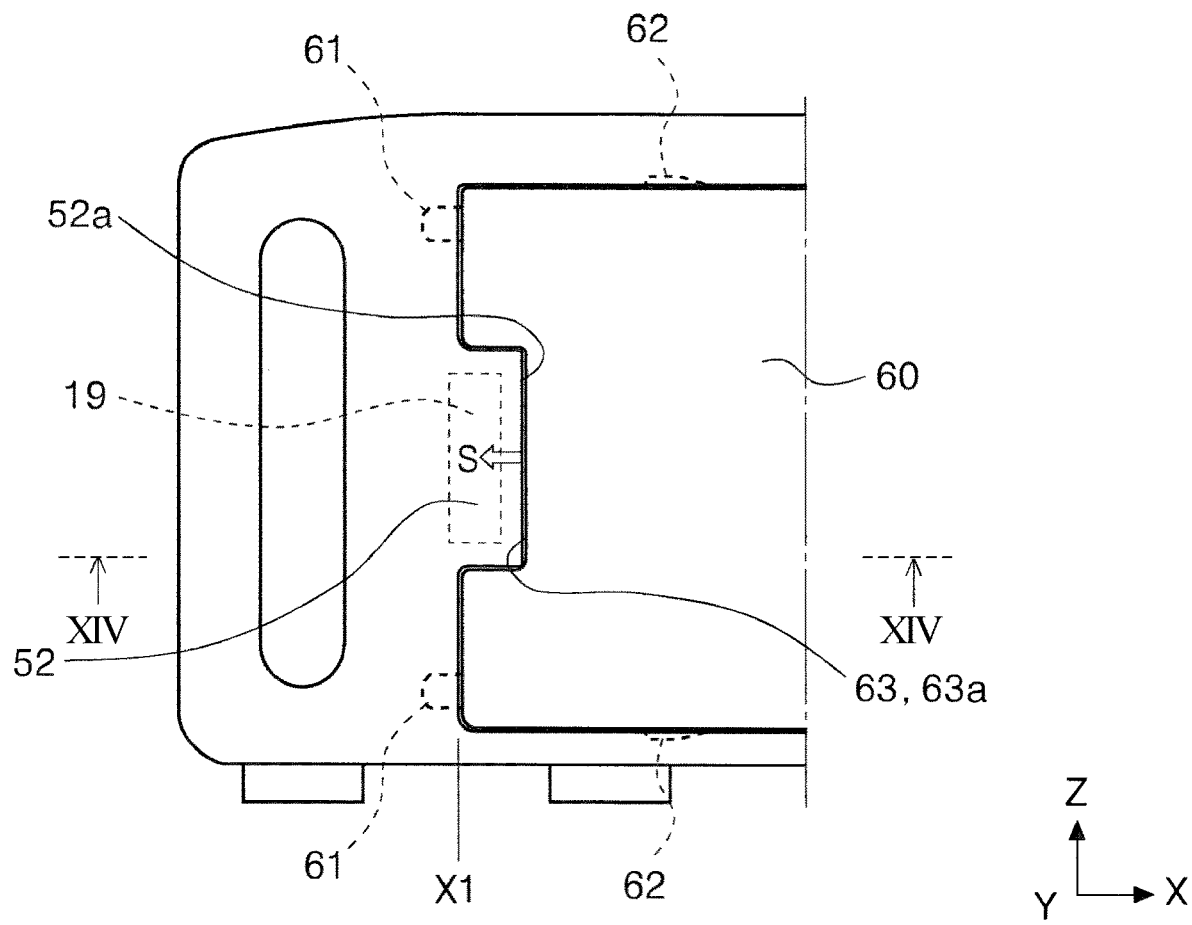
FIG. 13 is an enlarged view of an essential portion of a rear surface of the printer on which the cover is mounted.
Figure 14:
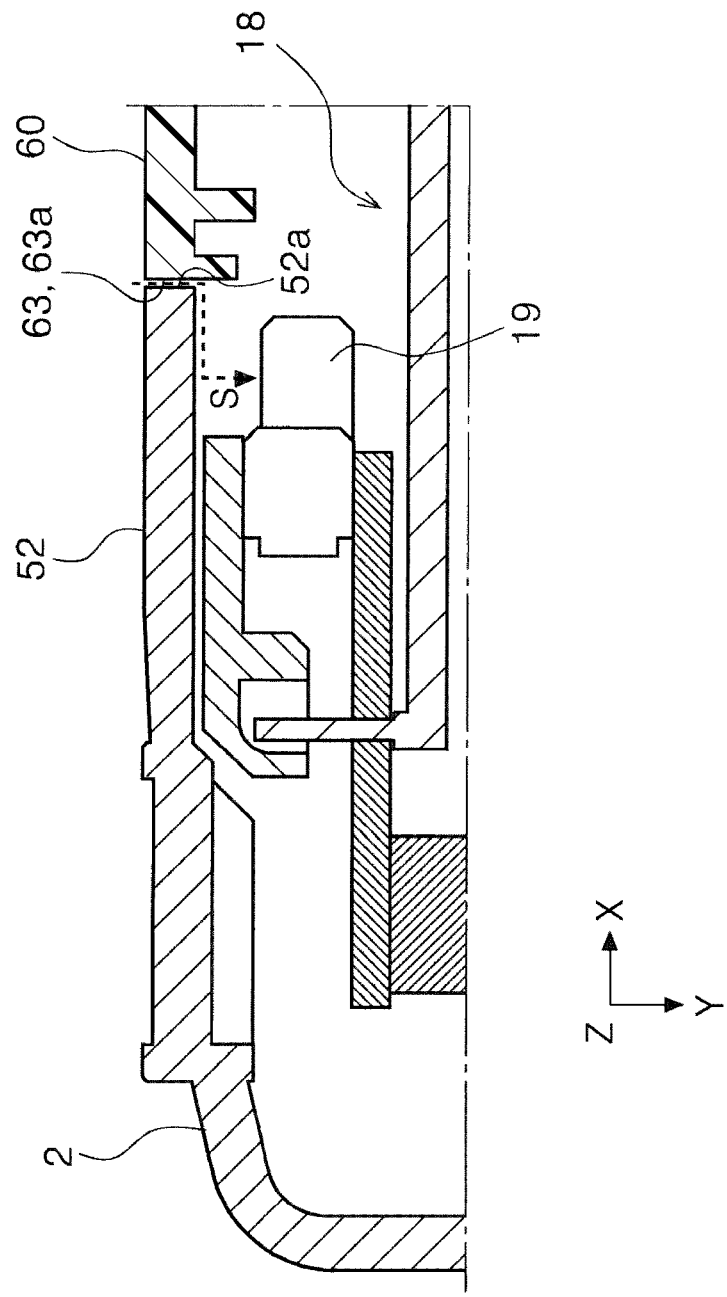
FIG. 14 is a sectional view taken along XIV-XIV in FIG. 13.

Referring next to FIGS. 13 and 14, a relationship between the recessed portion 63 formed at the end portion of the cover 60 in the −X direction and the covering portion 52 formed in the recessed portion 18 of the battery mount portion 50 will be described.

In a state in which the cover 60 is attached to the battery mount portion 50, when the printer 1 is mounted on a table and the like with the surface on which the cover 60 is provided, in other words, the rear surface of the printer 1, facing down, a liquid may enter the recessed portion 18 through the joint between the cover 60 and the housing 2. Particularly, when a liquid enters through the joint between the recessed portion 63 of the cover 60 and the covering portion 52, the liquid may adhere to the coupling terminal 19 and deteriorate the coupling terminal 19.

Particularly, when there is a portion where the cover 60 and the covering portion 52 overlap each other in a depth direction (the Y direction) of the recessed portion 18, the portion forms a liquid entering path and the liquid easily adheres to the coupling terminal 19. However, such an overlapping portion is a portion that is needed for restricting the cover 60 from rising in the −Y direction when the cover 60 has been attached to the battery mount portion 50.

Specifically, in the present exemplary embodiment, such a portion corresponds to the protruded portions 61 and the protrusions 62 described while referring to FIG. 9; however, in the present exemplary embodiment, the protruded portions 61 and the protrusions 62 are located outside a path (indicated by reference sign S in FIGS. 13 and 14) of a liquid heading towards the coupling terminal 19 after entering the recessed portion 18 through a portion where an edge portion 52a of the covering portion 52 and an edge portion 63a of the recessed portion 63 oppose each other. Accordingly, even when the liquid enters through the portion where the edge portion 63a of the cover 60 and the edge portion 52a of the covering portion 52 oppose each other, the liquid can be suppressed from advancing straight towards the coupling terminal 19.

Note that as illustrated in FIGS. 13 and 14, in the present exemplary embodiment, since the covering portion 52 is provided so as to, with respect to the distal end of the coupling terminal 19, extend in the direction (the +X direction) in which the coupling terminal 19 extend, the liquid can be suppressed from reaching the coupling terminal 19 when the liquid has entered through the portion where the edge portion 63a of the cover 60 and the edge portion 52a of the covering portion 52 oppose each other.

Furthermore, in the present exemplary embodiment, as illustrated in FIG. 9, since the recessed portion 64 serving as the cut-out portion, in other words, the recessed portion 64 forming the opening in which a finger is inserted, is formed in the periphery of the cover 60 at a position away from the portion where the cover 60 opposes the covering portion 52, even when a liquid enters through the recessed portion 64, the liquid can be suppressed from reaching the coupling terminal 19.

Figure 15:
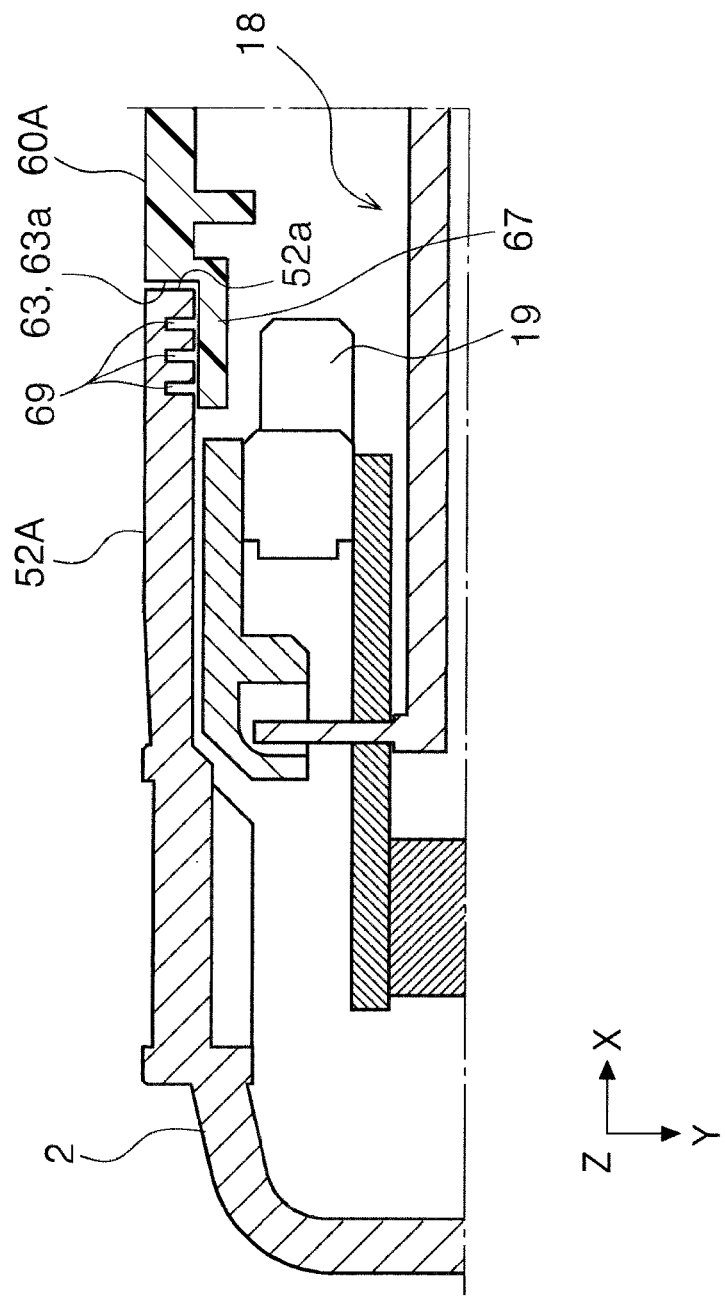
FIG. 15 is a sectional view illustrating another exemplary embodiment of FIG. 14.

Referring next to FIG. 15, other exemplary embodiments will be described. A cover 60A illustrated in FIG. 15 includes an overlapping portion 67 that overlaps a covering portion 52A in the Y direction. The overlapping portion 67 effectively suppresses the cover 60A from rising in the −Y direction.

Although a liquid entering path tends to be formed with the overlapping portion 67, groove portions 69 that extend in the Z-axis direction are formed at appropriate intervals in the X-axis direction in the portion in the covering portion 52A that opposes the overlapping portion 67, in other words, in the path of the liquid heading towards the coupling terminal 19 after entering the recessed portion 18 through a gap between the covering portion 52A and the cover 60A. Note that a length of each groove portion 69 in the Z-axis direction can be the same as the length of the covering portion 52A in the Z-axis direction, for example. Accordingly, by having the liquid enter the plurality of groove portions 69, the liquid can be suppressed from advancing straight towards the coupling terminal 19.

Figure 16:
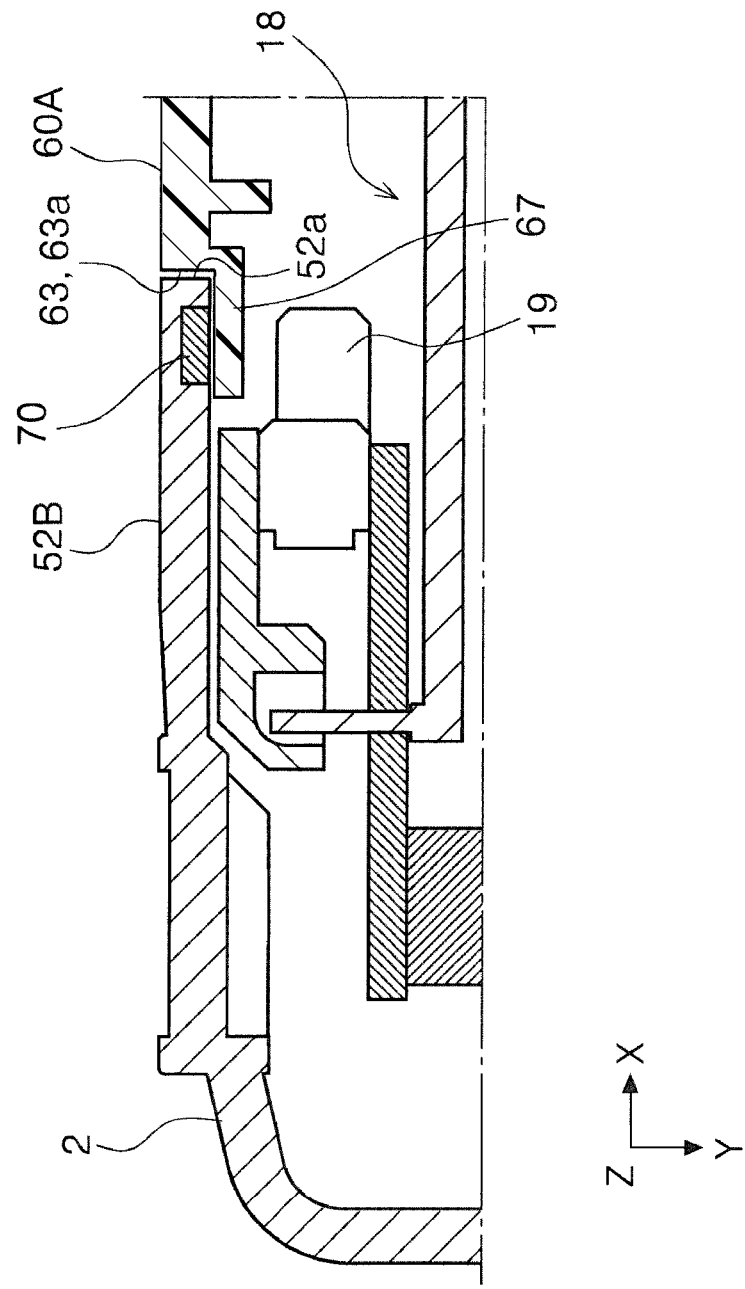
FIG. 16 is a sectional view illustrating another exemplary embodiment of FIG. 14.

Referring next to FIG. 16, still another exemplary embodiment will be described. The cover 60A illustrated in FIG. 16 includes the overlapping portion 67 that overlaps a covering portion 52B in the Y direction. Rising of the cover 60A in the −Y direction is effectively suppressed with the overlapping portion 67.

Although a liquid entering path tends to be formed with the overlapping portion 67, a liquid absorber 70 is provided in the portion in the covering portion 52B that opposes the overlapping portion 67, in other words, in the path of the liquid heading towards the coupling terminal 19 after entering the recessed portion 18 through a gap between the covering portion 52B and the cover 60A. Note that a length of the liquid absorber 70 in the Z-axis direction can be the same as the length of the covering portion 52B in the Z-axis direction, for example. Accordingly, the liquid can be suppressed from advancing straight towards the coupling terminal 19 with the liquid absorber 70.

Figure 17:
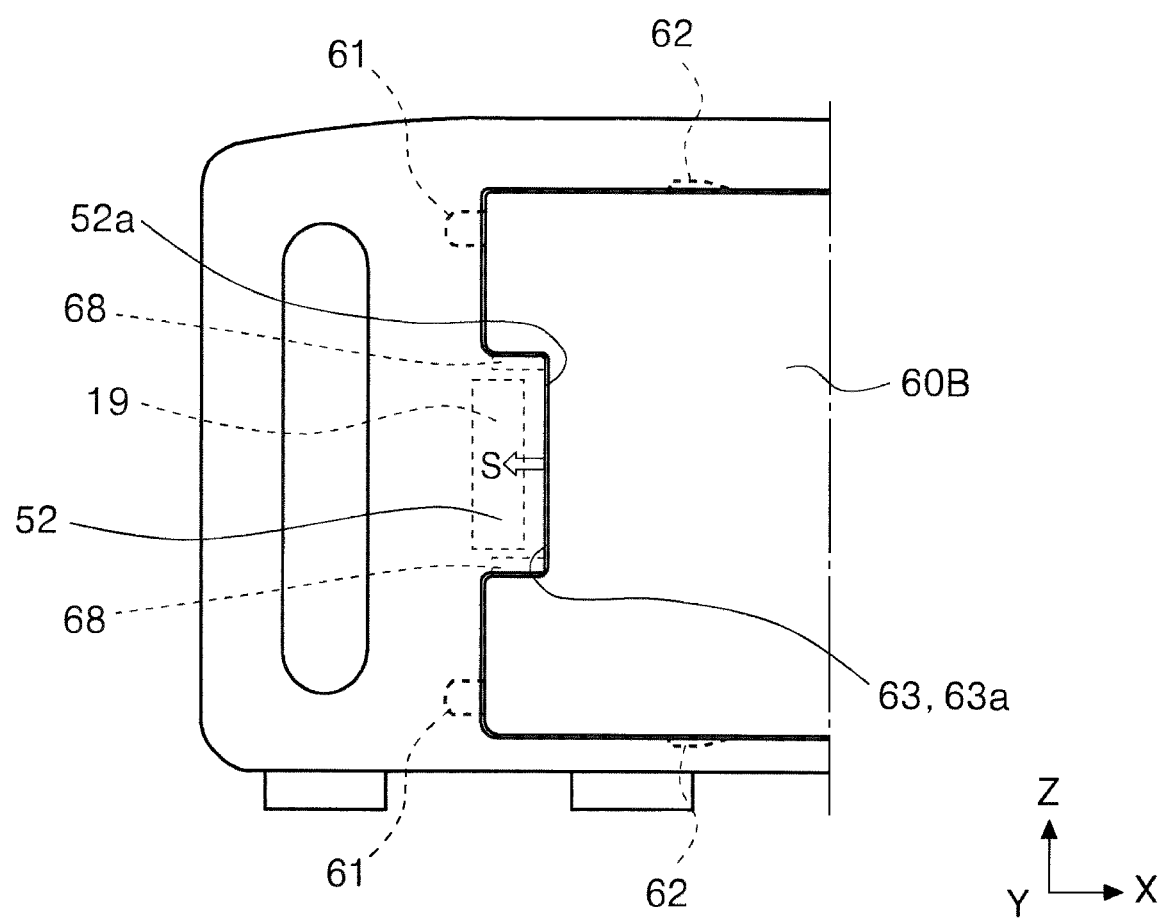
FIG. 17 is a sectional view illustrating another exemplary embodiment of FIG. 13.

Referring next to FIG. 17, still another exemplary embodiment will be described. The cover 60B illustrated in FIG. 17 includes overlapping portions 68 that overlap a covering portion 52 in the Y direction. Rising of the cover 60B in the −Y direction is effectively suppressed with the overlapping portions 68. The overlapping portions 68 are formed so as to overlap the covering portion 52 at both sides in the Z-axis direction.

The overlapping portions 68 are provided at positions deviated from the path S through which the liquid flows towards the coupling terminal 19, and due to the above, even when the liquid enters through the portion where the edge portion 63a of the cover 60B and the edge portion 52a of the covering portion 52 oppose each other, the liquid can be suppressed from advancing straight towards the coupling terminal 19.

Subsequently, a description will be given on an angle restricting portion that restricts an angle formed between the coupling terminal 19 (see FIG. 6) included in the battery mount portion, and the charging terminal 30 (see FIG. 7) included in the second battery.

Figure 18:
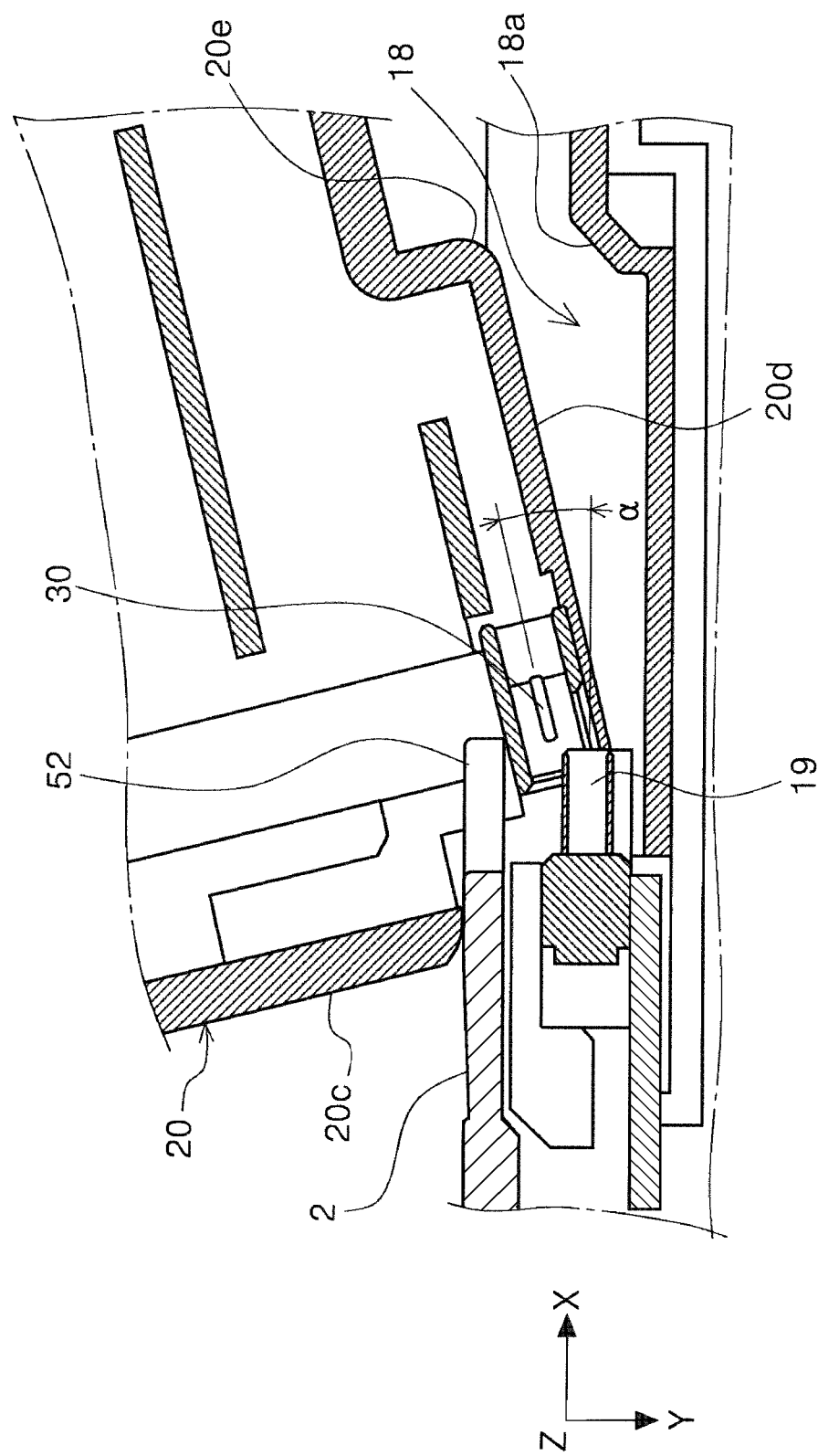
FIG. 18 is a sectional view of a battery and a battery mount portion.

FIG. 18 illustrates a section of a configuration that does not include an angle restricting portion. A technical problem in a configuration that does not include the angle restricting portion will be first described below.

As described above, the charging terminal 30 coupled to the coupling terminal 19 provided in the housing 2 is provided in the second battery 20 at the end portion in the −X direction. Furthermore, the end portion of the second battery 20 in the −X direction is fitted into the recessed portion 18 when mounting the second battery 20. The portion in the second battery 20 where the recessed portion 18 enters is illustrated by reference numeral 20d and, hereinafter, the above portion will be referred to as a protruded portion 20d (see FIG. 7 as well). Furthermore, reference numeral 20c is a lateral surface of the second battery 20 in the −X direction.

When the protruded portion 20d of the second battery 20 is fitted in the recessed portion 18, as illustrated in FIG. 18, in a case in which the position of the second battery 20 is inclined against the XY plane, the coupling terminal 19 and the charging terminal 30 will not become parallel to each other, in other words, an angle α will become large. When the second battery 20 is slid in the −X direction in the above state, the charging terminal 30 is deviated to the outside of the coupling terminal 19 and coupling may not be established appropriately. Furthermore, the substrate to which the terminals are fixed may become damaged.

Additionally, when a corner portion 20e of the protruded portion 20d in the +X direction abuts against an edge portion 18a of the recessed portion 18 in the +X direction, the coupling terminal 19 and the charging terminal 30 cannot oppose each other at correct positions and coupling cannot be established appropriately.

Figure 19:
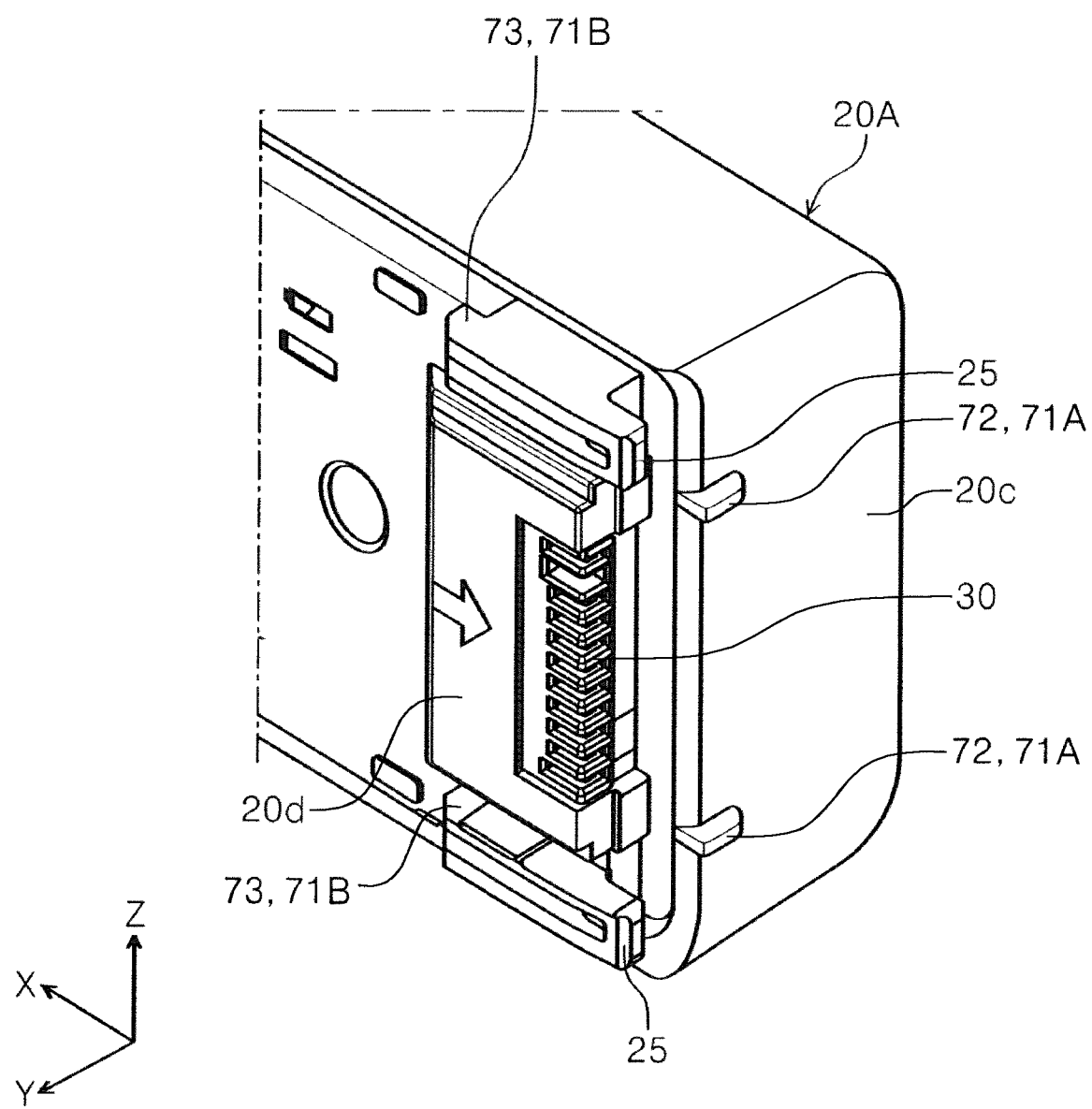
FIG. 19 is a partially enlarged perspective view of a battery according to another exemplary embodiment.

Accordingly, a second battery 20A illustrated in FIG. 19 and the subsequent drawings includes angle restricting portions 71A and 71B that restrict the angle formed between the coupling terminal 19 and the charging terminal 30.

Figure 20:
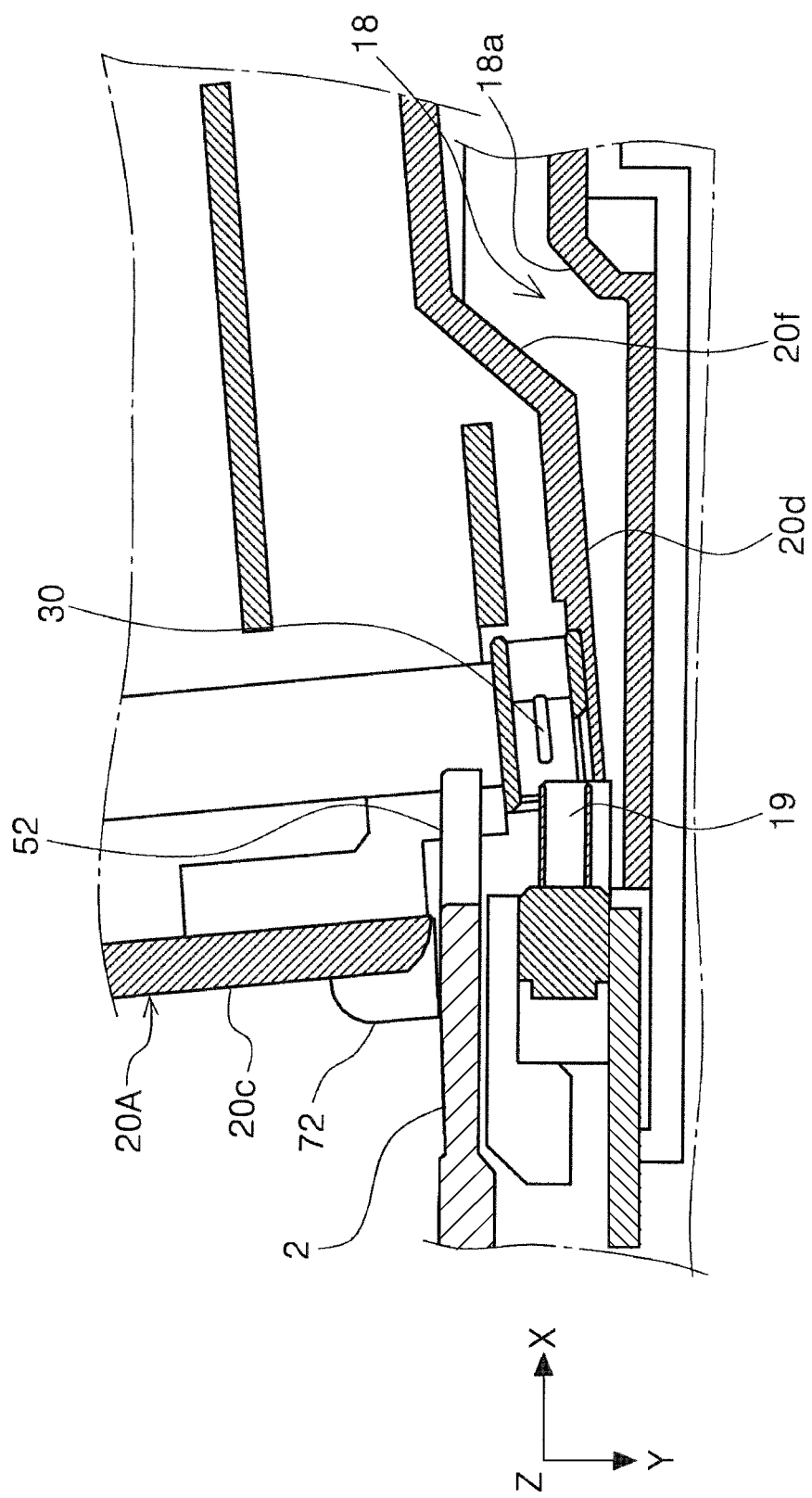
FIG. 20 is a sectional view of a battery and a battery mount portion according to another exemplary embodiment.

As illustrated in FIGS. 19 and 20, the angle restricting portions 71A are configured of projections 72 that are projected in the −X direction in a lateral surface 20c. In the present exemplary embodiment, two projections 72 are provided with a gap in between in the Z-axis direction.

As illustrated in FIG. 20, when the second battery 20A is mounted, the projections 72 abut against an external surface of the housing 2 to restrict the inclination of the second battery 20A when the coupling terminal 19 and the charging terminal 30 are coupled to each other and, consequently, restricts the angle formed between the coupling terminal 19 and the charging terminal 30. With the above, the coupling terminal 19 and the charging terminal 30 can be coupled to each other appropriately.

Note that in the present exemplary embodiment, two projections 72 are disposed with a gap in between in the Z-axis direction; however, not limited to the above, a single or three or more projections 72 may be provided, or a projection 72 may be formed so as to extend in the Z-axis direction. Furthermore, while the effect of suppressing the inclination of the second battery 20A increases as the projected amount of the projections 72 in the −X direction increases, it is desirable that the ease in which the projections 72 become damaged or suppression in the increase in size of the battery is taken into consideration when determining the projection amount of the projections 72.

Figure 22:
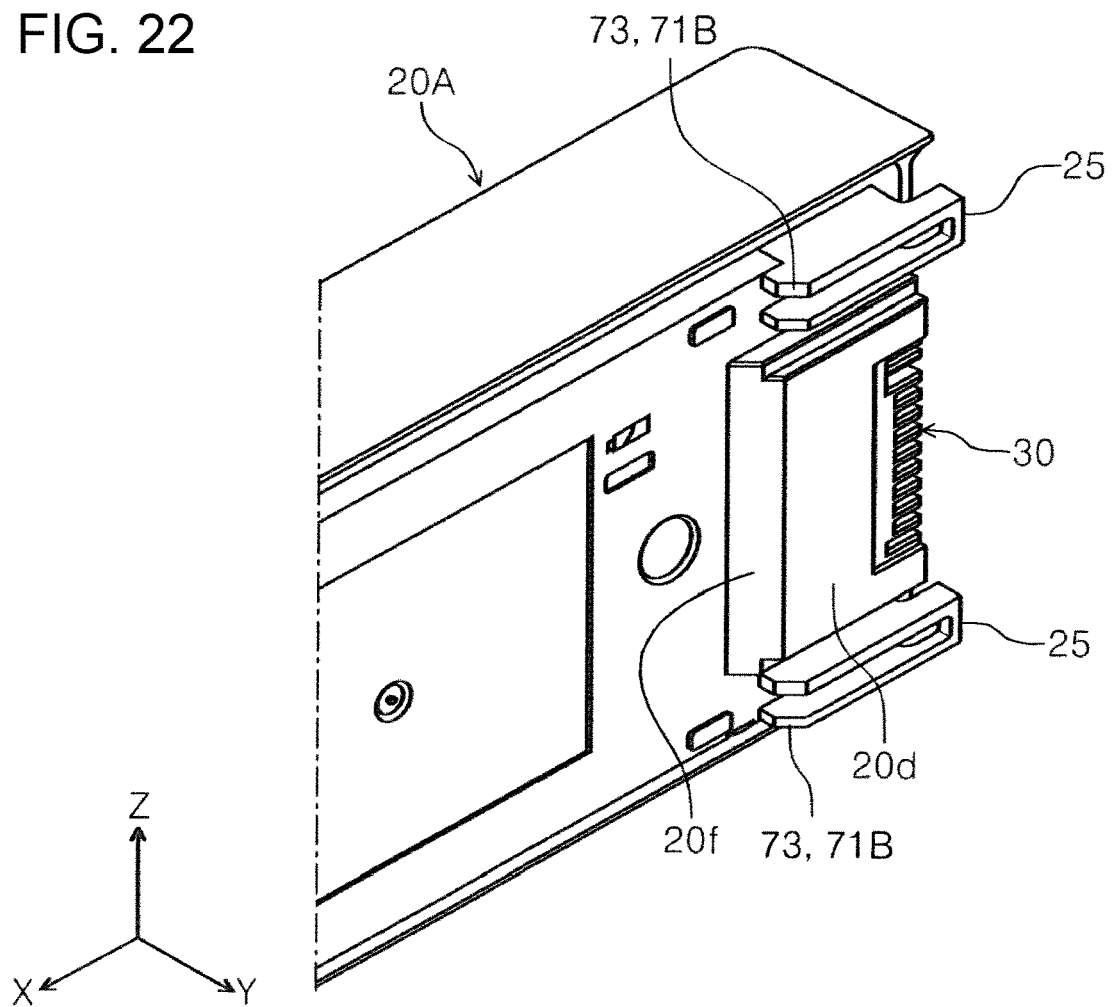
FIG. 22 is a partially enlarged perspective view of a battery according to another exemplary embodiment.
Figure 23:
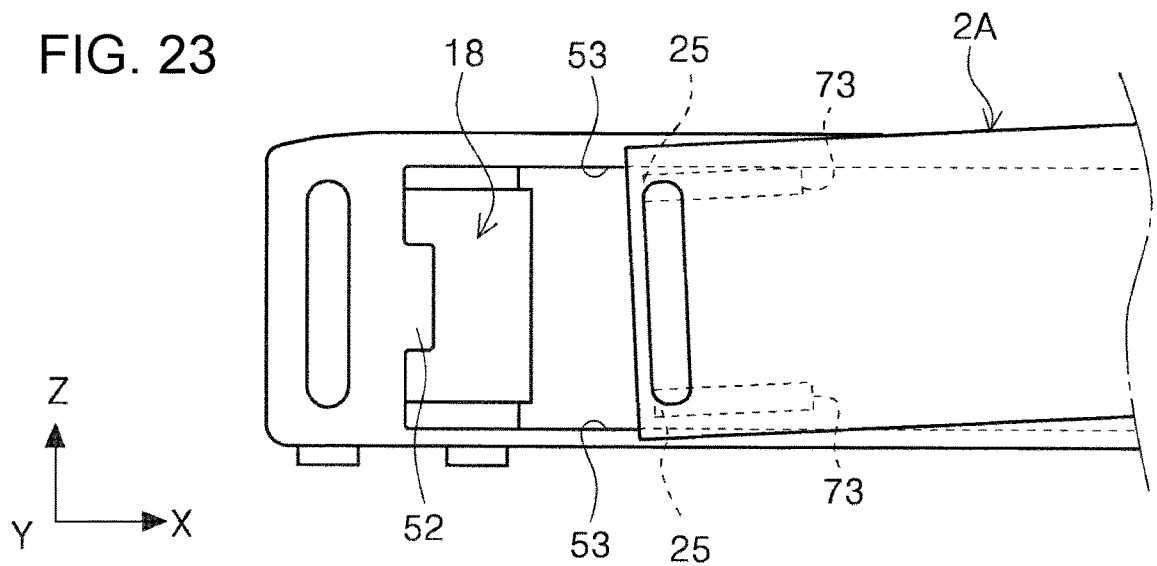
FIG. 23 is a plan view of a battery and a battery mount portion according to another exemplary embodiment.

As illustrated in FIGS. 19, 22, and 23, the angle restricting portions 71B are configured of projections 73 that are projected in the +X direction and that are provided on the opposite side of the protruded portions 25 described above in the X-axis direction. As illustrated in FIG. 23, by abutting against abutting surfaces 53 that are provided in the housing 2 and that extend in the X-axis direction or in a sliding direction of the second battery 20A, the projections 73 restrict the inclination of the second battery 20A in the XZ plane when the coupling terminal 19 and the charging terminal 30 are coupled to each other. With the above, the coupling terminal 19 and the charging terminal 30 can be coupled to each other appropriately.

Figure 21:
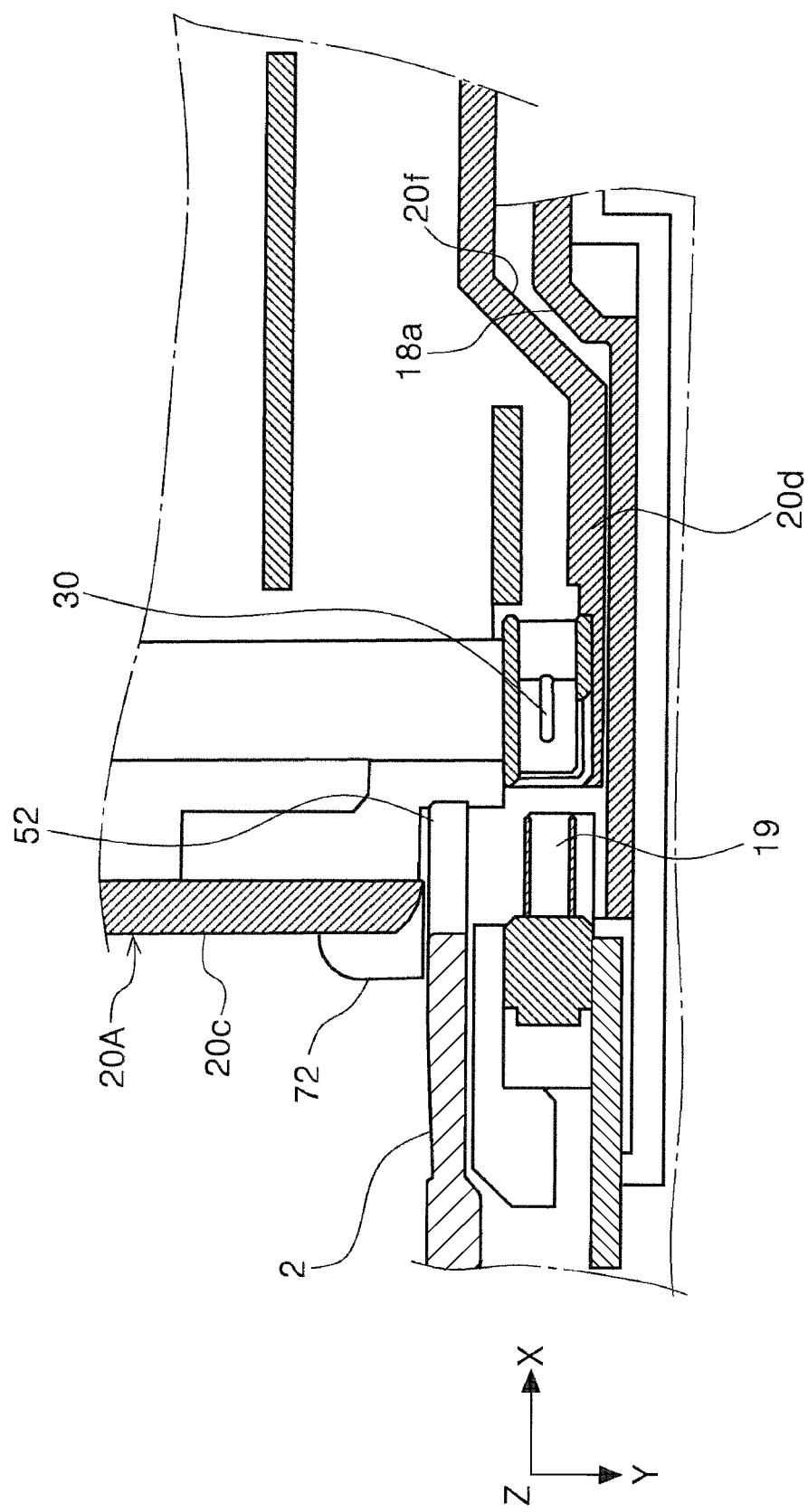
FIG. 21 is a sectional view of a battery and a battery mount portion according to another exemplary embodiment.

Furthermore, in the second battery 20A, a corner of the protruded portion 20d in the +X direction is chamfered and is formed as a chamfered portion 20f. With the chamfered portion 20f, when the protruded portion 20d of the second battery 20A is fitted into the recessed portion 18, as illustrated in FIG. 21, the coupling terminal 19 and the charging terminal 30 can oppose each other at correct positions, or the angle α depicted in FIG. 18 becomes 0° or close to 0°, while a gap is formed between the coupling terminal 19 and the charging terminal 30. With the above, the coupling terminal 19 and the charging terminal 30 can be coupled to each other appropriately.

The above configuration is not limited to a recording apparatus, a representative example thereof being a printer, and can be adopted in other electronic devices provided with an external battery, such as other electronic devices such as, for example, an image reading device, a representative example thereof being a scanner.

Furthermore, the present disclosure is not limited to the embodiments described above, and various modifications that are within the scope of the claims can be made. It goes without saying that such modifications are also included in the scope of the present disclosure.

What is claimed is:

1. A recording apparatus comprising:
a housing including a recording unit that performs recording on a medium; and
a battery mount portion which is provided in the housing, and to which a battery is detachably attachable, the battery supplying electric power to perform recording on a medium with the recording unit, wherein
the battery mount portion includes
a recessed portion into which a portion of the battery enters,
a coupling terminal provided inside the recessed portion and configured to be electrically coupled to the battery, and
a covering portion that covers the coupling terminal and that constitutes a portion of the housing, the covering portion extending in a first direction towards an opposite end of the recessed portion from an end associated with the coupling terminal, the covering portion extending in the first direction beyond a terminal end of the coupling terminal,
in a state in which the battery is unmounted, a cover that covers an area in the battery mount portion other than the covering portion is detachably attachable, a cut-out portion being formed in a periphery of the cover, the cut-out portion is formed in the periphery of the cover at a position away from the portion where the cover and the covering portion oppose each other, and
a portion where the cover and the housing overlap each other in a depth direction of the recessed portion, and which restricts the cover from rising from the battery mount portion, is located outside a liquid entering path extending toward the coupling terminal from a portion where the cover and the covering portion oppose each other.

2. The recording apparatus according to claim 1, wherein the covering portion is provided so as to, with respect to a distal end of the coupling terminal, extend in a direction in which the coupling terminal extends.

3. The recording apparatus according to claim 1, wherein a restriction wall that restricts foreign matter from entering from the cut-out portion to the recessed portion is provided on a back surface of the cover.

4. A recording apparatus comprising:
a housing including a recording unit that performs recording on a medium; and
a battery mount portion which is provided in the housing, and to which a battery is detachably attachable, the battery supplying electric power to perform recording on a medium with the recording unit, wherein
the battery mount portion includes
a recessed portion into which a portion of the battery enters,
a coupling terminal provided inside the recessed portion and configured to be electrically coupled to the battery, and
a covering portion that covers the coupling terminal and that constitutes a portion of the housing,
in a state in which the battery is unmounted, a cover that covers an area in the battery mount portion other than the covering portion is detachably attachable,
the cover and the housing include, in a liquid entering path extending towards the coupling terminal from a portion where the cover and the covering portion oppose each other, a cover portion overlapping a housing portion in a depth direction of the recessed portion, and
a groove portion into which the liquid enters is formed in the portion of the cover portion overlapping the housing portion of the housing.

5. A recording apparatus comprising:
a housing including a recording unit that performs recording on a medium; and
a battery mount portion which is provided in the housing, and to which a battery is detachably attachable, the battery supplying electric power to perform recording on a medium with the recording unit, wherein
the battery mount portion includes
a recessed portion into which a portion of the battery enters,
a coupling terminal provided inside the recessed portion and configured to be electrically coupled to the battery, and
a covering portion that covers the coupling terminal and that constitutes a portion of the housing,
in a state in which the battery is unmounted, a cover that covers an area in the battery mount portion other than the covering portion is detachably attachable,
the cover and the housing include, in a liquid entering path extending toward the coupling terminal from a portion where the cover and the covering portion oppose each other, a portion of the covering portion overlapping a cover portion in a depth direction of the recessed portion, and
a liquid absorber that absorbs the liquid is provided in the covering portion of the housing portion overlapping the cover portion.

* * * * *